US012437941B2

(12) United States Patent
Sasaki et al.

(10) Patent No.: US 12,437,941 B2
(45) Date of Patent: Oct. 7, 2025

(54) ROTARY OPERATOR AND AUDIO DEVICE

(71) Applicant: AlphaTheta Corporation, Yokohama (JP)

(72) Inventors: Kenji Sasaki, Yokohama (JP); Nao Takagi, Yokohama (JP)

(73) Assignee: Alpha Theta Corporation, Yokohama shi (JP)

( * ) Notice: Subject to any disclaimer, the term of this patent is extended or adjusted under 35 U.S.C. 154(b) by 127 days.

(21) Appl. No.: 18/549,481

(22) PCT Filed: Mar. 9, 2021

(86) PCT No.: PCT/JP2021/009389
§ 371 (c)(1),
(2) Date: Sep. 7, 2023

(87) PCT Pub. No.: WO2022/190222
PCT Pub. Date: Sep. 15, 2022

(65) Prior Publication Data
US 2024/0153722 A1 May 9, 2024

(51) Int. Cl.
*H01H 19/14* (2006.01)
*G06F 3/16* (2006.01)

(52) U.S. Cl.
CPC ............. *H01H 19/14* (2013.01); *G06F 3/162* (2013.01)

(58) Field of Classification Search
CPC ............ H01H 3/00; H01H 3/08; H01H 19/00; H01H 19/02; H01H 19/04; H01H 19/14;
(Continued)

(56) References Cited

U.S. PATENT DOCUMENTS 4,320,267 A * 3/1982 Greve .................... H01H 25/06 200/336
2016/0020045 A1* 1/2016 McAllister ............... G05G 5/03 200/336

FOREIGN PATENT DOCUMENTS

JP 63-232225 A 9/1988
JP 2005-100856 A 4/2005
(Continued)

OTHER PUBLICATIONS

International Search Report dated Jun. 1, 2021, Application No. PCT/JP2021/009389; English translation included, 4 pages.
(Continued)

*Primary Examiner* — Anthony R Jimenez
(74) *Attorney, Agent, or Firm* — Rankin, Hill & Clark LLP

(57) ABSTRACT

A rotary operator includes: a rotator including a movement path provided for an outer circumferential surface and inclined to a circumferential direction about a rotation axis, the rotator rotating about the axis; and a contact piece coming into contact with the rotator, and moving along the path in a direction along the axis in association with rotation of the rotator. Rotation of the rotator in a first rotation direction is restricted by the contact piece being at a first position when the rotator reaches a predetermined position. When rotating force applied to the rotator is reduced in a state where rotation of the rotator in the first rotation direction from the predetermined position is restricted, the contact piece returns to a second position to allow the rotation of the rotator in the first rotation direction from the predetermined position.

9 Claims, 24 Drawing Sheets

(58) Field of Classification Search
CPC ............. H01H 19/18; H01H 2003/028; H01H 2003/0286; H01H 2003/08; H01H 2221/00; H01H 2221/01; H01H 2221/064; H01H 2231/036; H01H 19/11; H01H 19/20; H01H 3/20; H01H 3/42; G06F 3/00; G06F 3/16; G06F 3/162
USPC ........................................................ 200/336
See application file for complete search history.

(56) References Cited

FOREIGN PATENT DOCUMENTS

| | | | |
|---|---|---|---|
| JP | 2008-293952 | A | 12/2008 |
| JP | 2013-38378 | A | 2/2013 |
| JP | 2019-156368 | A | 9/2019 |

OTHER PUBLICATIONS

English translation of the International Preliminary Report on Patentability issued Sep. 12, 2023 in the corresponding International application No. PCT/JP2021/009389 (4 pages).

* cited by examiner

ROTARY OPERATOR AND AUDIO DEVICE

TECHNICAL FIELD

The disclosure relates to a rotary operator and an acoustic device.

BACKGROUND ART

A variable resistor has been conventionally known in which a resistance value is changed by rotating a shaft (see, for example, Patent Literature 1).

There is also known a container of a switch that locks an operation handle rotated to an on-operation position (see, for example, Patent Literature 2).

The container described in Patent Literature 2 includes a stopper piece in addition to the operation handle. The stopper piece restricts rotation of the operation handle when the operation handle is rotated to the on-position, and locks the operation handle at the on-position. The stopper piece releases the operation handle from the locked state if the operation handle is pushed in while the operation handle is in the locked state.

This prevents, when performing an on-operation on the operation handle, the operation handle from continuing to be rotated in an off-direction after passing the on-position, and prevents the operation handle from being rotated to an off-position.

CITATION LIST

Patent Literature(s)
Patent Literature 1: JP 2013-38378 A
Patent Literature 2: JP 2005-100856 A

SUMMARY OF THE INVENTION

Problems to be Solved by the Invention

In an acoustic device, a variable resistor described in Patent Literature 1 may be employable as a rotary operator that adjusts an effect amount of a first effect, for example, by rotating a shaft clockwise with respect to a reference position and that adjusts an effect amount of a second effect different from the first effect, for example, by rotating counterclockwise.

However, in the variable resistor described in Patent Literature 1, the shaft passes the reference position with no resistance. This may cause a case where the shaft accidentally passes the reference position when the shaft is rotated clockwise or counterclockwise to adjust, for example, the effect amount of the first effect.

In contrast, when the variable resistor is configured such that the shaft is to be locked at the reference position by reference to a container described in Patent Literature 2, an operation handle needs to be pushed in to release the lock, which is inconvenient to use.

Thus, there is a demand for a rotary operator that improves operability.

An object of the disclosure is to solve at least some of the above-described issues. It is one of the objects of the disclosure to provide a rotary operator with improved operability.

Means for Solving the Problem(s)

A rotary operator according to a first aspect of the disclosure includes: a rotator including a movement path provided for an outer circumferential surface and inclined to a circumferential direction about a rotation axis, the rotator being configured to rotate about the rotation axis; and a contact piece configured to come into contact with the rotator, and move along the movement path in a direction along the rotation axis in association with rotation of the rotator, in which rotation of the rotator in a first rotation direction about the rotation axis is restricted by the contact piece being at a first position when the rotator is rotated in the first rotation direction and reaches a predetermined position; and when rotating force in the first rotation direction applied to the rotator is reduced in a state where rotation of the rotator in the first rotation direction from the predetermined position is restricted, the contact piece returns to a second position to allow the rotation of the rotator in the first rotation direction from the predetermined position.

An acoustic device according to a second aspect of the disclosure includes the above rotary operator.

DESCRIPTION OF EMBODIMENT(S)

First Exemplary Embodiment

Figure 1:
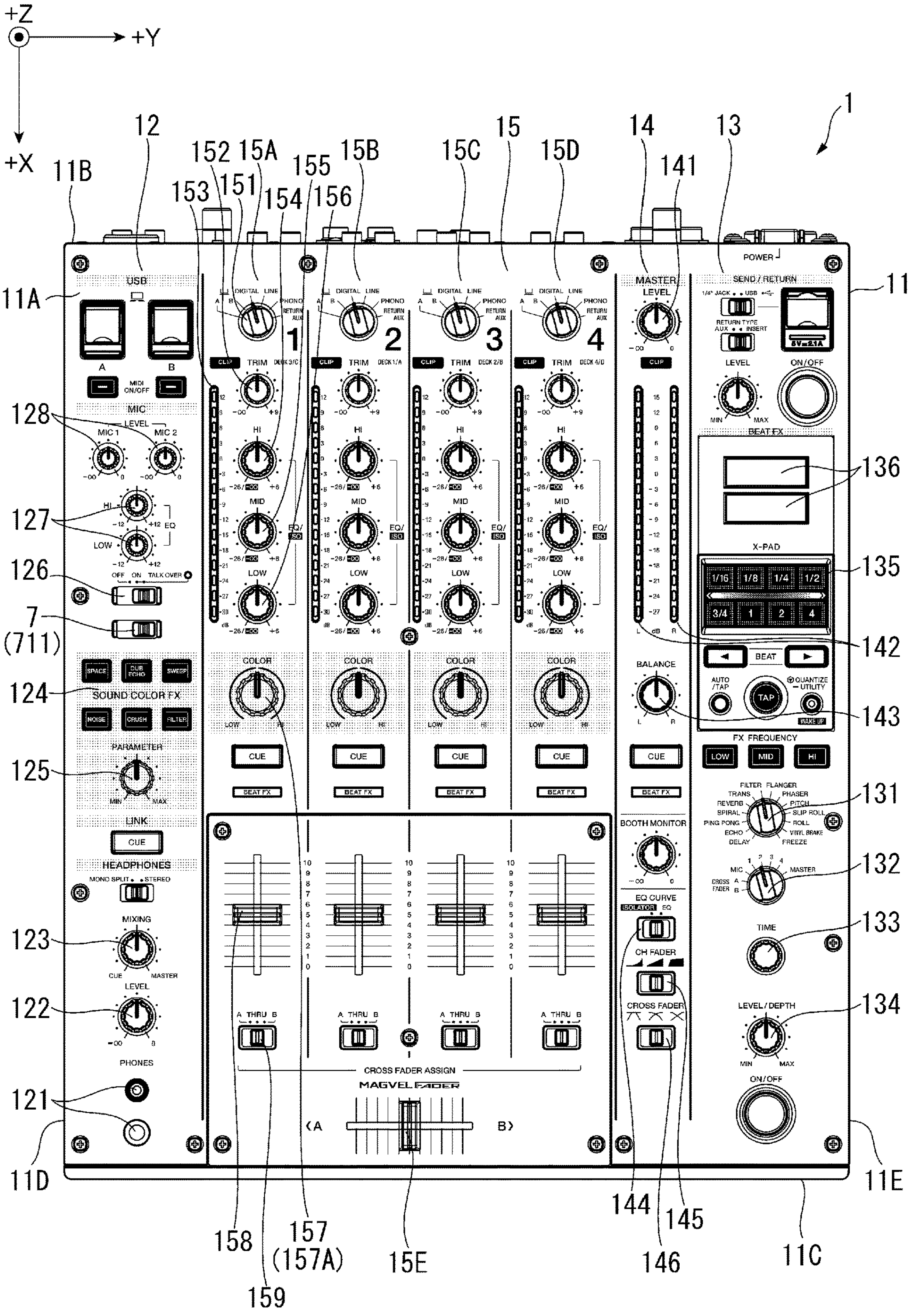
FIG. 1 is a plan view of a mixer according to a first exemplary embodiment.

Referring to the drawings, a first exemplary embodiment of the disclosure will be described below.

Overall Configuration of Acoustic Device

FIG. 1 is a plan view of an acoustic device 1 according to the exemplary embodiment.

The acoustic device 1 according to the exemplary embodiment is a mixer that mixes pieces of music supplied from a music playback device such as an analog player, a CD player, or a computer that executes music playback software, and outputs an audio signal corresponding to the mixed music. The acoustic device 1 adds a predetermined effect to each of the inputted pieces of music.

As illustrated in FIG. 1, the acoustic device 1 includes a casing 11, a microphone adjuster 12, an effect processor 13, a master adjuster 14, and an equalizer adjuster 15.

Configuration of Casing

The casing 11, which has a substantially rectangular parallelepiped shape, contains therein a controller (not illustrated) that controls an operation of the acoustic device 1. The casing 11 has a top surface 11A, an upper surface 11B, a lower surface 11C, a left side surface 11D, a right side surface 11E, and an unillustrated bottom surface.

Exposed on the top surface 11A are the microphone adjuster 12, the effect processor 13, the master adjuster 14, and the equalizer adjuster 15.

A terminal(s) to which a music playback device and a music operating device such as a DJ player are connectable are provided on the upper surface 11B.

In the following description, three directions orthogonal to each other are defined as a +X direction, a +Y direction, and a +Z direction. The +Z direction is a direction from the bottom surface toward the top surface 11A. That is, the +Z direction is a direction perpendicular to the top surface 11A. The +X direction is a direction from the upper surface 11B toward the lower surface 11C, and the +Y direction is a direction from the left side surface 11D toward the right side surface 11E.

Although not illustrated, an opposite direction of the +X direction is a −X direction, an opposite direction of the +Y direction is a −Y direction, and an opposite direction of the +Z direction is a −Z direction.

Configuration of Microphone Adjuster

The microphone adjuster 12 includes a headphone terminal 121, a sound volume adjuster 122, a mixing adjuster 123, a master effect switcher 124, a master effect amount adjuster 125, a microphone switcher 126, a microphone equalizer adjuster 127, and a microphone sound volume adjuster 128. On the microphone adjuster 12, a slide operator 711 is exposed.

To the headphone terminal 121, unillustrated headphones are connected.

The sound volume adjuster 122 adjusts a sound volume outputted from the headphones.

The mixing adjuster 123 adjusts a balance of the sound volume outputted from the headphones, that is, a balance between an output sound volume of a channel with a CUE button being pressed and an output sound volume of a master channel.

The master effect switcher 124 includes six buttons. The master effect switcher 124 performs switching from effects to be applied to pieces of music of all channels provided in the equalizer adjuster 15 to an effect preset for a pressed button. Examples of the effect for switching by use of the master effect switcher 124 include effects classified in “SOUND COLOR EFFECT”.

The master effect amount adjuster 125 adjusts an effect amount that is an application amount of the effect after the switching by use of the master effect switcher 124.

The microphone switcher 126 performs on/off switching on a microphone connected to the acoustic device 1.

The microphone equalizer adjuster 127 adjusts a volume of a sound to be inputted from the microphone in accordance with a frequency.

The microphone sound volume adjuster 128 adjusts a volume of a sound to be outputted from the microphone.

The slide operator 711 is included in a state switching mechanism 7 which will be described later. The slide operator 711, which is provided to be slidable in the ±Y directions, switches operation modes of the effect adjuster 157 and operational feelings of the effect adjuster 157 in accordance with a position of the slide operator 711. A configuration of the state switching mechanism 7 including the slide operator 711 and a configuration of the effect adjuster 157 will be described in detail later.

Configuration of Effect Processor The effect processor 13 adds an effect to the inputted music. Examples of the effect to be added by the effect processor 13 include effects classified in “BEAT EFFECT”.

The effect processor 13 includes an effect switcher 131, a channel switcher 132, an effect time setter 133, an effect amount adjuster 134, a magnification setter 135, and a display 136.

The effect switcher 131 is a switch for selecting an effect to be added to the music.

The channel switcher 132 selects, from among all channels provided for the equalizer adjuster 15, a channel with which the effect is to be added to the music.

The effect time setter 133 sets a duration of adding the selected effect.

The effect amount adjuster 134 adjusts an effect amount of the selected effect.

The magnification setter 135 sets a beat magnification to synchronize a timing of adding the effect based on BPM of the inputted music. Examples of the settable beat magnification include 1 beat, 2 beats, ½ beats, and ¼ beats of BPM of the music.

The display 136 displays the selected effect, or BPM of the inputted music. In the exemplary embodiment, the display 136 displays the name of the effect selected in the effect switcher 131, and BPM of the music or the beat magnification set by the magnification setter 135.

Configuration of Master Adjuster

The master adjuster 14 adjusts music as a whole to be outputted from the acoustic device 1. The master adjuster 14 includes a master sound volume adjuster 141, a level indicator 142, a sound volume balance adjuster 143, an equalizer switcher 144, a first characteristic switcher 145, and a second characteristic switcher 146.

The master sound volume adjuster 141 adjusts a sound volume of the whole music to be outputted from the acoustic device 1.

The level indicator 142 displays left and right output sound volumes of the music to be outputted from the acoustic device 1.

The sound volume balance adjuster 143 adjusts a balance between the left and right output sound volumes of the music to be outputted from the acoustic device 1.

The equalizer switcher 144 switches equalizer curves.

The first characteristic switcher 145 switches curve characteristics of a volume fader 158 of the equalizer adjuster 15.

The second characteristic switcher 146 switches curve characteristics when switching is performed by a cross fader 15E to be described later.

Configuration of Equalizer Adjuster

The equalizer adjuster 15 performs an equalizer adjustment process for each channel on the music inputted to the acoustic device 1. The equalizer adjuster 15 includes a first channel adjuster 15A that adjusts a first channel, a second channel adjuster 15B that adjusts a second channel, a third channel adjuster 15C that adjusts a third channel, a fourth channel adjuster 15D that adjusts a fourth channel, and the cross fader 15E.

The channel adjusters 15A to 15D are each connected to, for example, the above-described music playback device or the above-described music operating device such as the DJ player. It is possible for each of the channel adjusters 15A to 15D to perform equalizer adjustment on the music to be inputted. The channel adjusters 15A to 15D each include an input switcher 151, a level adjuster 152, a level indicator 153, a high-frequency band adjuster 154, a medium-frequency band adjuster 155, a low-frequency band adjuster 156, the effect adjuster 157, the volume fader 158, and a cross fader switcher 159.

The input switcher 151 switches input sources. Specifically, the input switcher 151 switches input-source music playback devices among music playback devices including, without limitation, an analog player connected to a phono terminal of the acoustic device 1, a CD player connected to a line terminal, and a computer connected to a USB terminal.

The level adjuster 152 adjusts an input level of the music inputted from the music playback device selected by the input switcher 151.

The level indicator 153 displays the input level adjusted by the level adjuster 152.

The high-frequency band adjuster 154 adjusts a sound volume of a high-frequency band of the inputted music. The high-frequency band is, for example, a frequency band higher than or equal to 4649 Hz.

The medium-frequency band adjuster 155 adjusts a sound volume of a medium-frequency band of the inputted music. The medium-frequency band is, for example, a frequency band higher than 284 Hz and lower than 4649 Hz.

The low-frequency band adjuster 156 adjusts a sound volume of a low-frequency band of the inputted music. The low-frequency band is, for example, a frequency band lower than or equal to 284 Hz.

The effect adjuster 157 adjusts an effect amount of an effect set for the corresponding one of the channel adjusters 15A to 15D. In other words, the acoustic device 1 includes an effect adjuster 157A that is the effect adjuster 157 of the first channel adjuster 15A, an effect adjuster 157B that is the effect adjuster 157 of the second channel adjuster 15B, an effect adjuster 157C that is the effect adjuster 157 of the third channel adjuster 15C, and an effect adjuster 157D that is the effect adjuster 157 of the fourth channel adjuster 15D. The effect adjuster 157 includes a rotary operator 2 (see FIG. 2) to be described later.

The volume fader 158 adjusts a volume of a sound to be outputted from the corresponding one of the channel adjusters 15A to 15D.

The cross fader switcher 159 switches an output destination of the corresponding one of the adjusters 15A to 15D to one of an A side (a left side) or a B side (a right side) of the cross fader 15E.

The cross fader 15E includes an operator that is movable to the left and to the right. As the operator is moved to the left, a proportion of a sound volume of the channel switched to the A side increases in terms of the sound volume to be outputted from the acoustic device 1. Further, as the operator is moved to the right, a proportion of a sound volume of the channel switched to the B side increases in terms of the sound volume to be outputted from the acoustic device 1.

Internal Configuration of Acoustic Device

Figure 2:
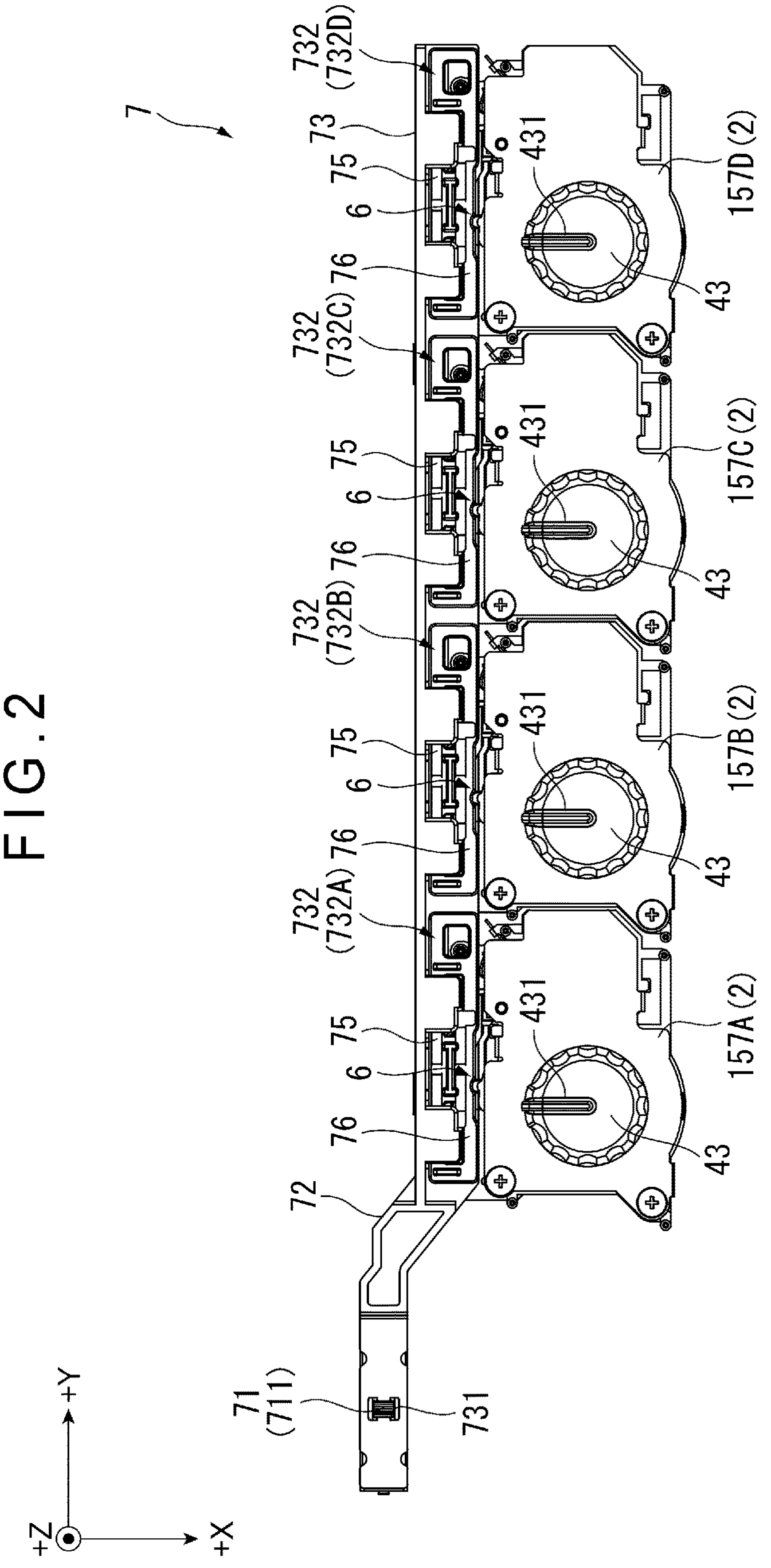
FIG. 2 is a plan view of a rotary operator and a state switching mechanism according to the first exemplary embodiment.

FIG. 2 is a plan view of the rotary operator 2 and the state switching mechanism 7 included in the casing 11.

As illustrated in FIG. 2, the acoustic device 1 includes the rotary operator 2 in which a knob 43 is exposed on the top surface 11A (see FIG. 1) toward an outside of the casing 11, and an operational-feeling switching mechanism 6 and the state switching mechanism 7 provided inside the casing 11.

The rotary operator 2 is an operator to be rotated by a user. The rotary operator 2 configures each of the effect adjusters 157A to 157D. That is, the acoustic device 1 includes four rotary operators 2 arranged along the +Y direction.

The operational-feeling switching mechanism 6 is provided correspondingly to each of the rotary operators 2. The operational-feeling switching mechanism 6 switches operational feelings at a timing at which the rotary operator 2 is operated.

The state switching mechanism 7 switches states of the rotary operator 2, specifically, switches operation modes of the rotary operator 2. The operation mode of the rotary operator 2 may also be regarded as the operation mode of the acoustic device 1 that includes the rotary operator 2. As will be described in detail later, the state switching mechanism 7 switches the operation modes of each rotary operator 2 and causes each operational-feeling switching mechanism 6 to operate in response to the switching operation of the user on the state switching mechanism 7.

The rotary operator 2, the operational-feeling switching mechanism 6, and the state switching mechanism 7 will be described below.

Configuration of Rotary Operator

Figure 3:
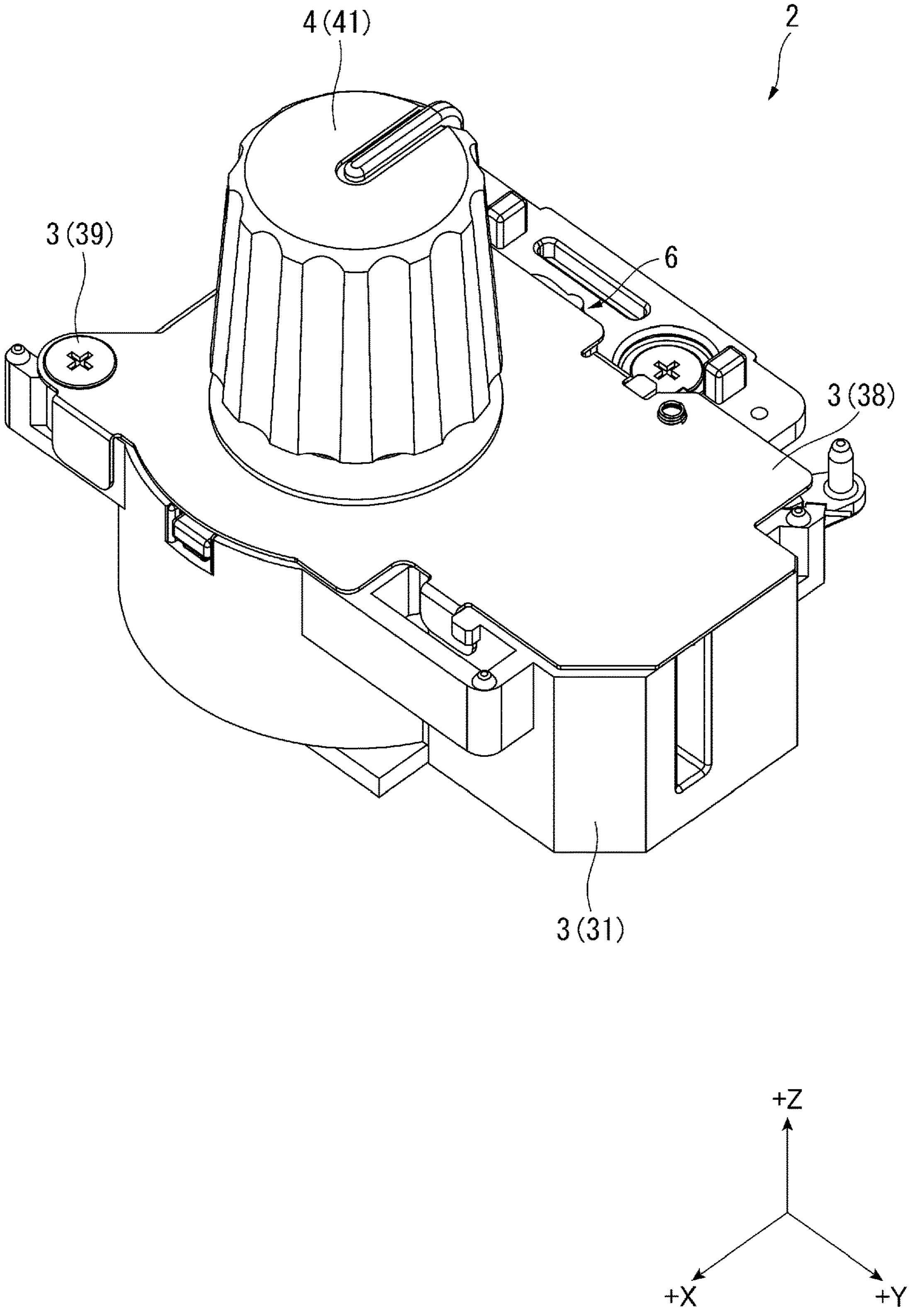
FIG. 3 is a perspective view of the rotary operator according to the first exemplary embodiment.
Figure 4:
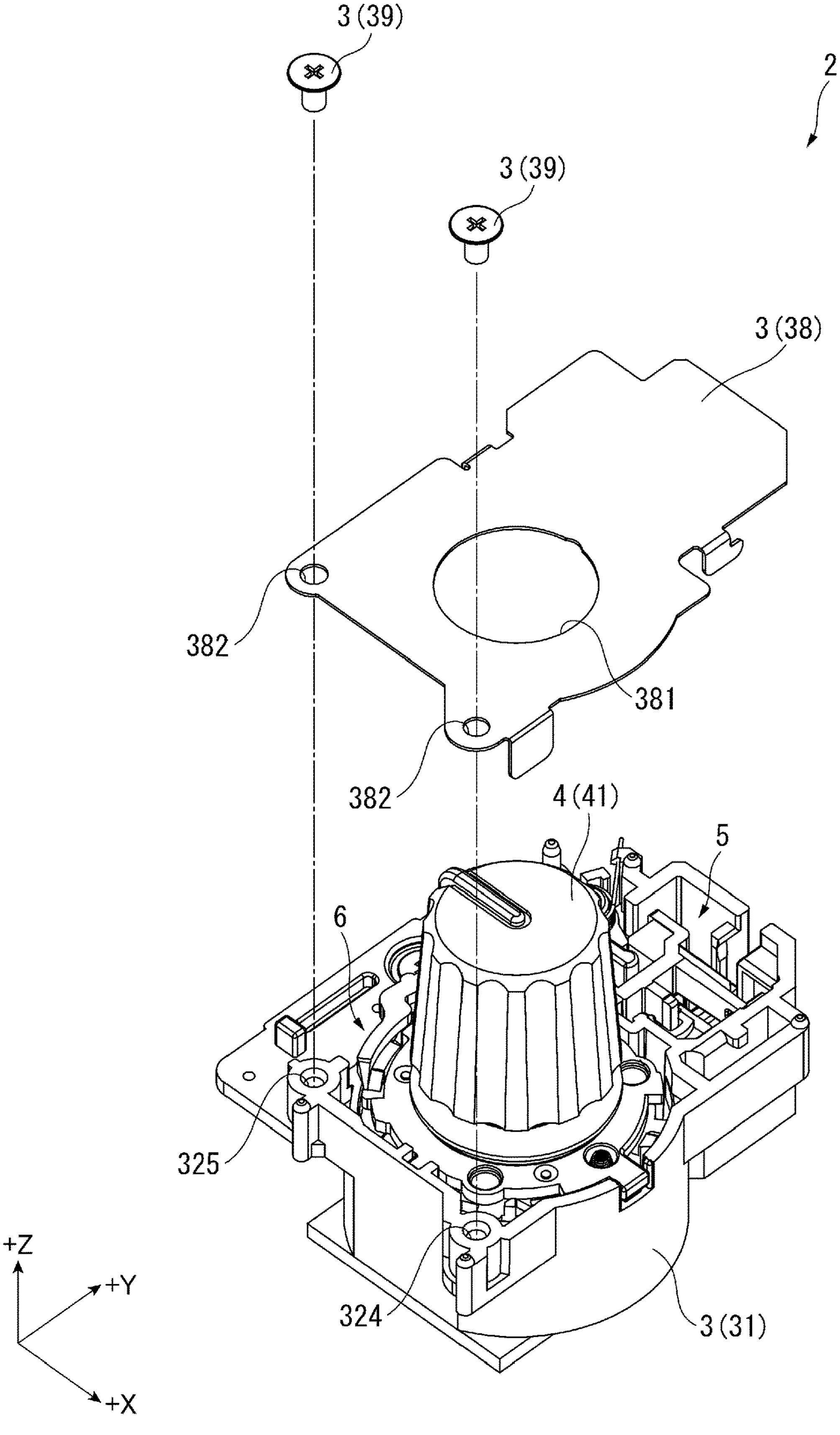
FIG. 4 is a perspective view of the rotary operator according to the first exemplary embodiment in which a cover and a fixing member are separated.
Figure 5:
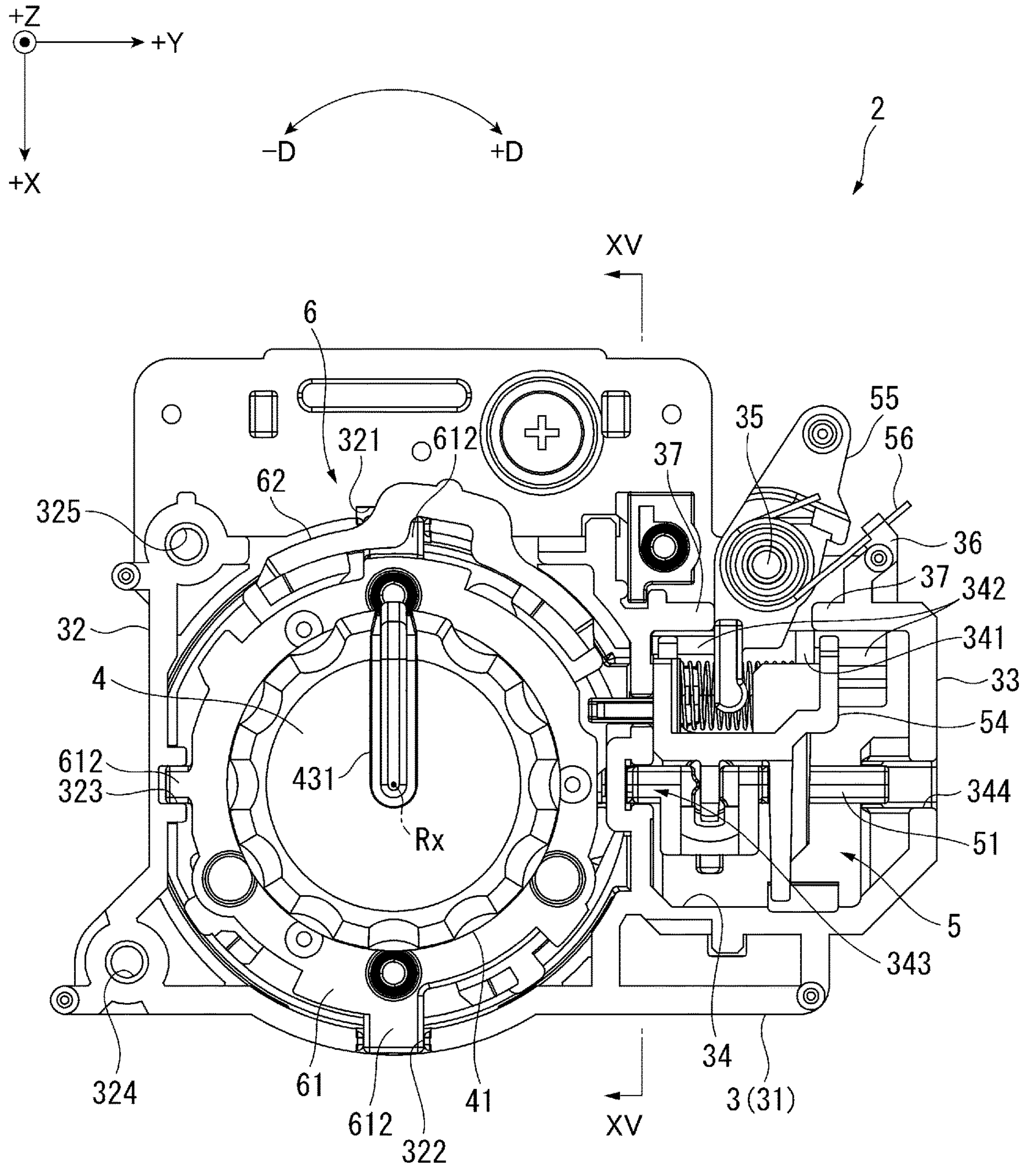
FIG. 5 is a plan view of the rotary operator according to the first exemplary embodiment in which the cover and the fixing member are removed.

FIG. 3 is a perspective view of the rotary operator 2. FIG. 4 is a perspective view of the rotary operator 2 in which a cover 38 and a fixing member 39 of a casing 3 are separated. FIG. 5 is a plan view of the rotary operator 2 viewed from the +Z direction in which the cover 38 and the fixing member 39 are removed.

As illustrated in FIGS. 3 to 5, the rotary operator 2 includes the casing 3, an operator body 4, and a restriction switching mechanism 5.

Configuration of Casing

Figure 6:
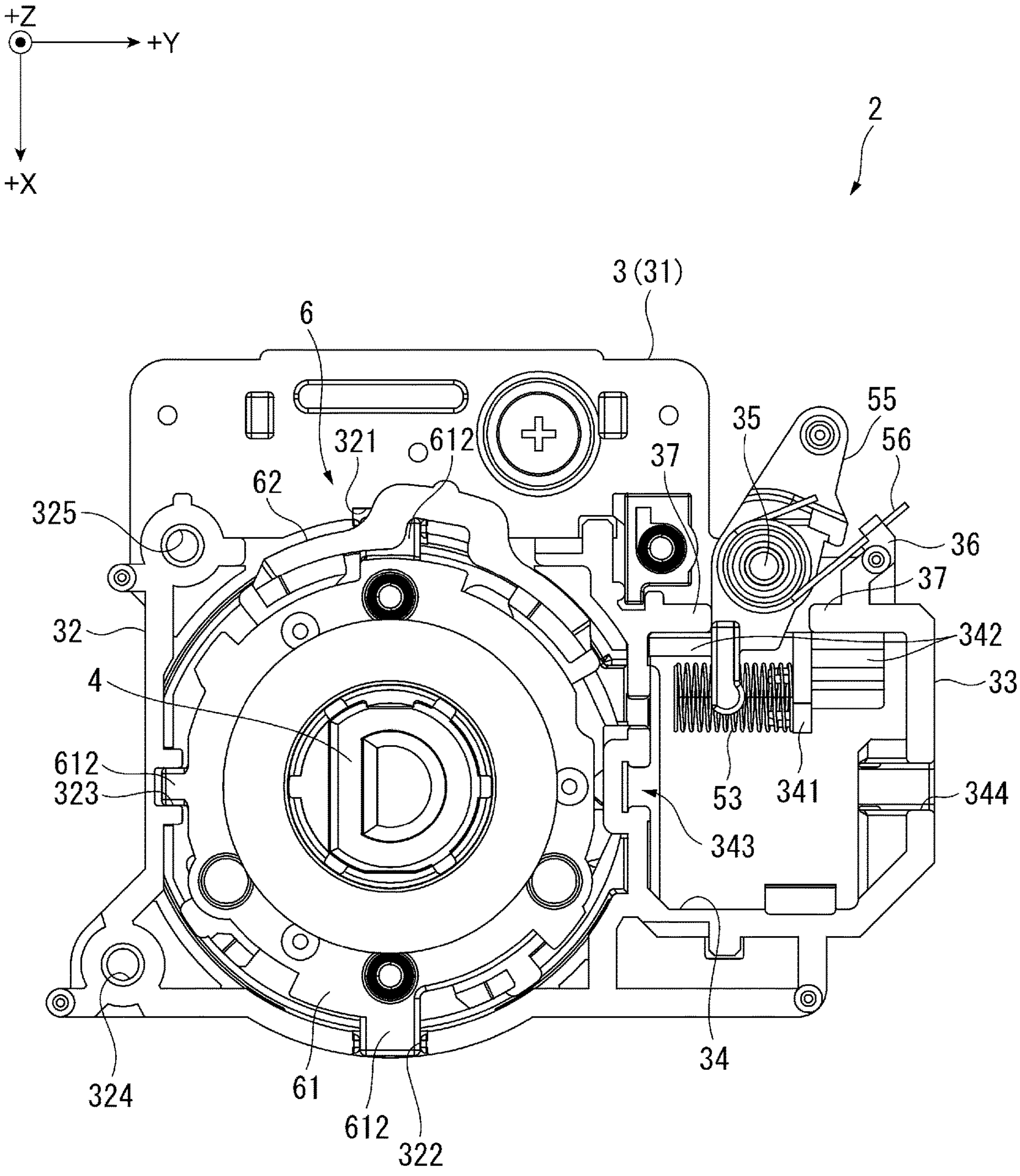
FIG. 6 is a plan view of a casing according to the first exemplary embodiment.

FIG. 6 is a plan view of the casing 3 viewed from the +Z direction. In FIG. 6, of members included in the rotary operator 2, some members engaged with the casing 3 are illustrated together with the casing 3.

The casing 3, which has a substantially rectangular parallelepiped shape, supports the operator body 4, the restriction switching mechanism 5, and the operational-feeling switching mechanism 6. As illustrated in FIGS. 3 to 6, the casing 3 includes a casing body 31 in which the operator body 4 is disposed, and as illustrated in FIGS. 3 and 4, the casing 3 includes the cover 38 and the fixing member 39.

As illustrated in FIGS. 5 and 6, the casing body 31 includes a first arrangement portion 32 and a second arrangement portion 33.

The first arrangement portion 32, which has a substantially rectangular shape as viewed from the +Z direction and is provided in the casing 3, is a part where the operator body 4 and a portion of the operational-feeling switching mechanism 6 are disposed. The first arrangement portion 32 is open in the +Z direction. The first arrangement portion 32 includes guides 321, 322, and 323 and fixing portions 324 and 325.

The guides 321 to 323 are each a recess that is provided at a periphery in the +Z direction of the first arrangement portion 32 and opens in the +Z direction. On the periphery in the +Z direction of the first arrangement portion 32, the guide 321 is provided at a position in the −X direction, the guide 322 is provided at a position in the +X direction, and the guide 323 is provided at a position in the −Y direction.

In each of the guides 321 to 323, a to-be-guided portion 612 included in a click plate 61, which will be described later, of the operational-feeling switching mechanism 6 is disposed. When a movement base 62 to be described later of the operational-feeling switching mechanism 6 is rotated clockwise or counterclockwise as viewed from the +Z direction, the guides 321 to 323 guide movement in the ±Z directions of the click plate 61 while preventing the click plate 61 that engages with the movement base 62 from rotating together with the movement base 62.

The fixing portions 324 and 325 are each a part that fixes the fixing member 39. The fixing member 39 fixes the cover 38 to the casing body 31. In the exemplary embodiment, the fixing portions 324 and 325 are each a threaded hole into which the fixing member 39 that is a screw is screwed.

The second arrangement portion 33, which is provided in the +Y direction with respect to the first arrangement portion 32, is a part where the restriction switching mechanism 5 is disposed. The second arrangement portion 33 includes a support 34, a lever support 35, a locking portion 36, and a range defining portion 37.

The support 34 supports, for example, a contact piece 51 and a holding member 54 of the restriction switching mechanism 5. The support 34 passes through the casing 3 along the +Z direction. The support 34 includes a holding portion 341, guides 342 and 344, and a guide hole 343.

The holding portion 341 is provided on an inner surface in the −X direction of the support 34. The holding portion 341 holds an end in the +Y direction of a second biasing member 53 to be described later. As will be described in detail below, the holding portion 341 and the second biasing member 53 are disposed inside the holding member 54 that is disposed within the support 34.

The guide 342 is provided in the +Y direction with respect to the holding portion 341, and is provided continuously with the holding portion 341 in the +Y direction with respect to the holding portion 341. Each guide 342 guides movement in the ±Y directions of the holding member 54.

The guide hole 343 is an opening that allows the first arrangement portion 32 to communicate with the second arrangement portion 33. The guide hole 343 is provided to be long in the +Z direction. A contact portion 515 of the contact piece 51 to be disposed in the support 34 is inserted through the guide hole 343 toward the first arrangement portion 32. An inner diameter of the guide hole 343 in the +X direction is substantially the same as a dimension of the contact portion 515 in the +X direction.

The guide 344 is a recess that is provided at a position in the +Y direction of a periphery of the second arrangement portion 33, and opens in the +Y direction and +Z direction. The guide 344 supports the contact piece 51 so that the contact piece 51 is movable in the ±Y directions and the ±Z directions.

The lever support 35 rotatably supports a switching member 55 of the restriction switching mechanism 5. Specifically, the lever support 35 supports the switching member 55 so that the switching member 55 is rotatable clockwise and counterclockwise, as viewed from the +Z direction.

The locking portion 36 is provided in the lever support 35 to lock one end of a third biasing member 56. The third biasing member 56 is a torsion coil spring that biases counterclockwise the switching member 55. The other end of the third biasing member 56 is locked to the switching member 55.

Two range defining portions 37 are provided at positions in the +X direction with respect to the lever support 35. The range defining portions 37 are separated from each other in the +Y direction. The range defining portions 37 sandwich, in the +Y direction, the switching member 55 supported by the lever support 35, thereby defining a rotation range of the switching member 55.

The cover 38 is fixed to the casing body 31 from the +Z direction by two fixing members 39, as illustrated in FIG. 4. The cover 38 is a member that covers a portion of the operational-feeling switching mechanism 6 to be described later in the +Z direction and retains a portion of the operational-feeling switching mechanism 6 within the first arrangement portion 32. The cover 38 has an opening 381 having a circular shape through which a portion of a rotating body 44 is to be inserted, and has two holes 382 through which the fixing members 39 are to be inserted.

Figure 7:
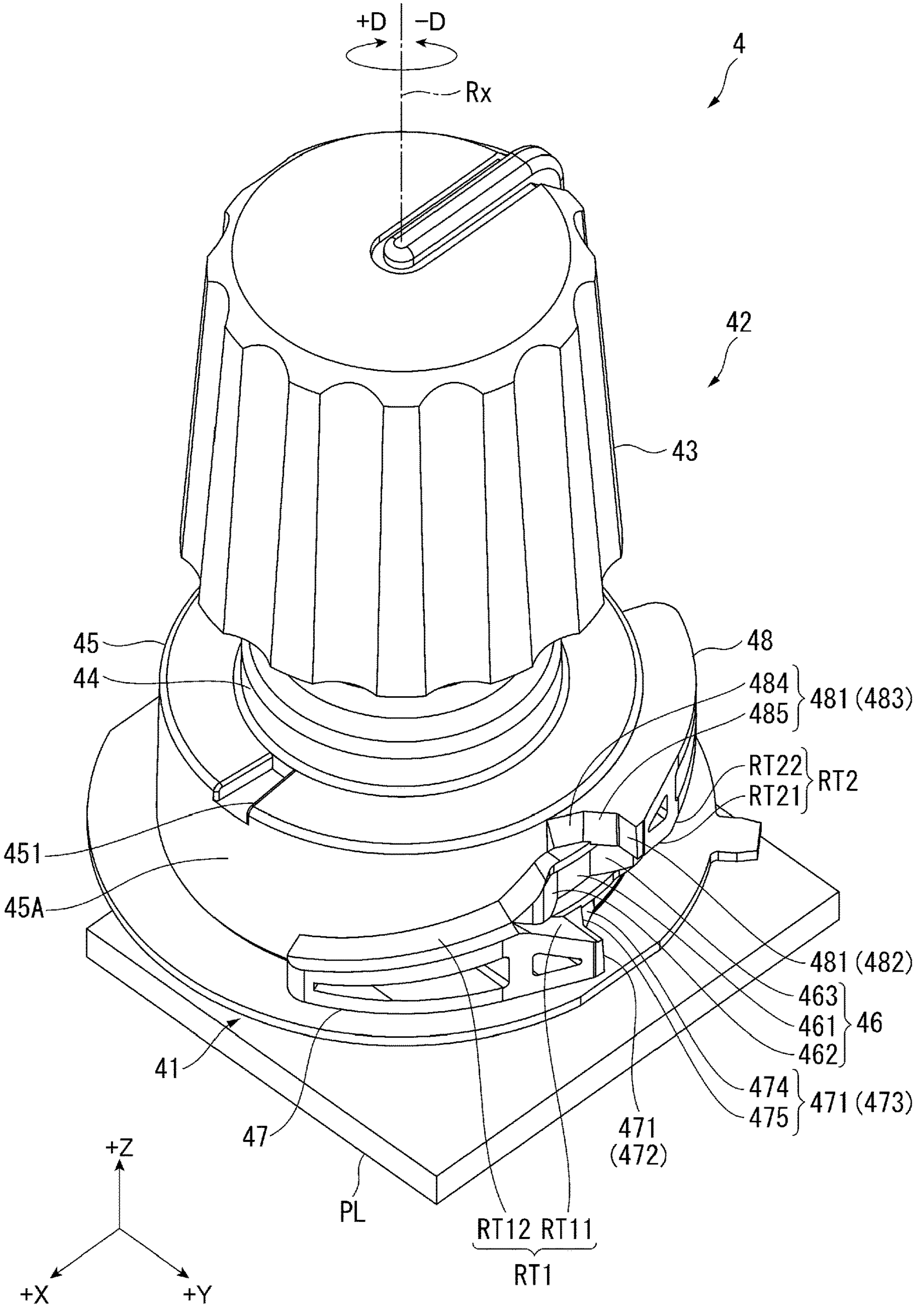
FIG. 7 is a perspective view of an operator body according to the first exemplary embodiment.

Configuration of operator body FIG. 7 is a perspective view of the operator body 4.

The operator body 4 is a rotary volume that is to be operated by the user and outputs a rotation angle with respect to a reference position. The operator body 4 includes a base 41 and a rotator 42.

The base 41 supports the rotator 42 so that the rotator 42 is rotatable about a rotation axis Rx extending along the +Z direction. The base 41 is fixed to a board PL. The base 41 includes a detector (not illustrated) that detects the rotation angle of the rotator 42. A known technique is employable for a configuration of the detector that detects the rotation angle, and explanation thereof will thus be omitted. Further, the board PL is a portion of the controller that configures the acoustic device 1 or a board that is electrically connected to the controller.

The rotator 42 is rotated by the user about the rotation axis Rx. The rotator 42 includes the knob 43 for the user to pinch, and the rotating body 44 to which the knob 43 is attached, the rotating body 44 being rotated integrally with the knob 43.

The knob 43 has an indicating line 431 that indicates a rotation position of the rotator 42. As illustrated in FIG. 5, when a position of the rotator 42 with the indicating line 431 being parallel to the −X direction and being directed to the −X direction is set as a reference position, the rotator 42 is configured to be rotatable clockwise substantially 150° from the reference position, for example, and rotatable counterclockwise substantially 150° from the reference position, for example. That is, the reference position is a position at which a range from the reference position to a position where the clockwise rotation of the rotator 42 about the rotation axis Rx is allowed as viewed from the +Z direction is equal in length to a range from the reference position to a position where the counterclockwise rotation of the rotator 42 about the rotation axis Rx is allowed as viewed from the +Z direction. In other words, the reference position is a position at which a rotation range from the reference position to a clockwise rotation limit is equal in length to a rotation range from the reference position to a counterclockwise rotation limit. The reference position corresponds to a predetermined position according to the disclosure.

In the following explanation, a clockwise direction viewed from the +Z direction is set as a +D direction, and a counterclockwise direction viewed from the +Z direction is set as a −D direction.

The rotating body 44 includes a cylindrical portion 45 having a cylindrical shape about the rotation axis Rx.

The cylindrical portion 45 includes a fitting portion 451 on the plane in the +Z direction. In the fitting portion 451, a protrusion 614 (see, FIG. 17) to be described later provided in the click plate 61 is fitted in association with the rotation of the rotator 42.

The cylindrical portion 45 includes, on an outer circumferential surface 45A about the rotation axis Rx: a recess 46 recessed in a direction toward the rotation axis Rx from the outer circumferential surface 45A; and path forming portions 47 and 48 each protruding radially outward about the rotation axis Rx from the outer circumferential surface 45A.

Figure 8:
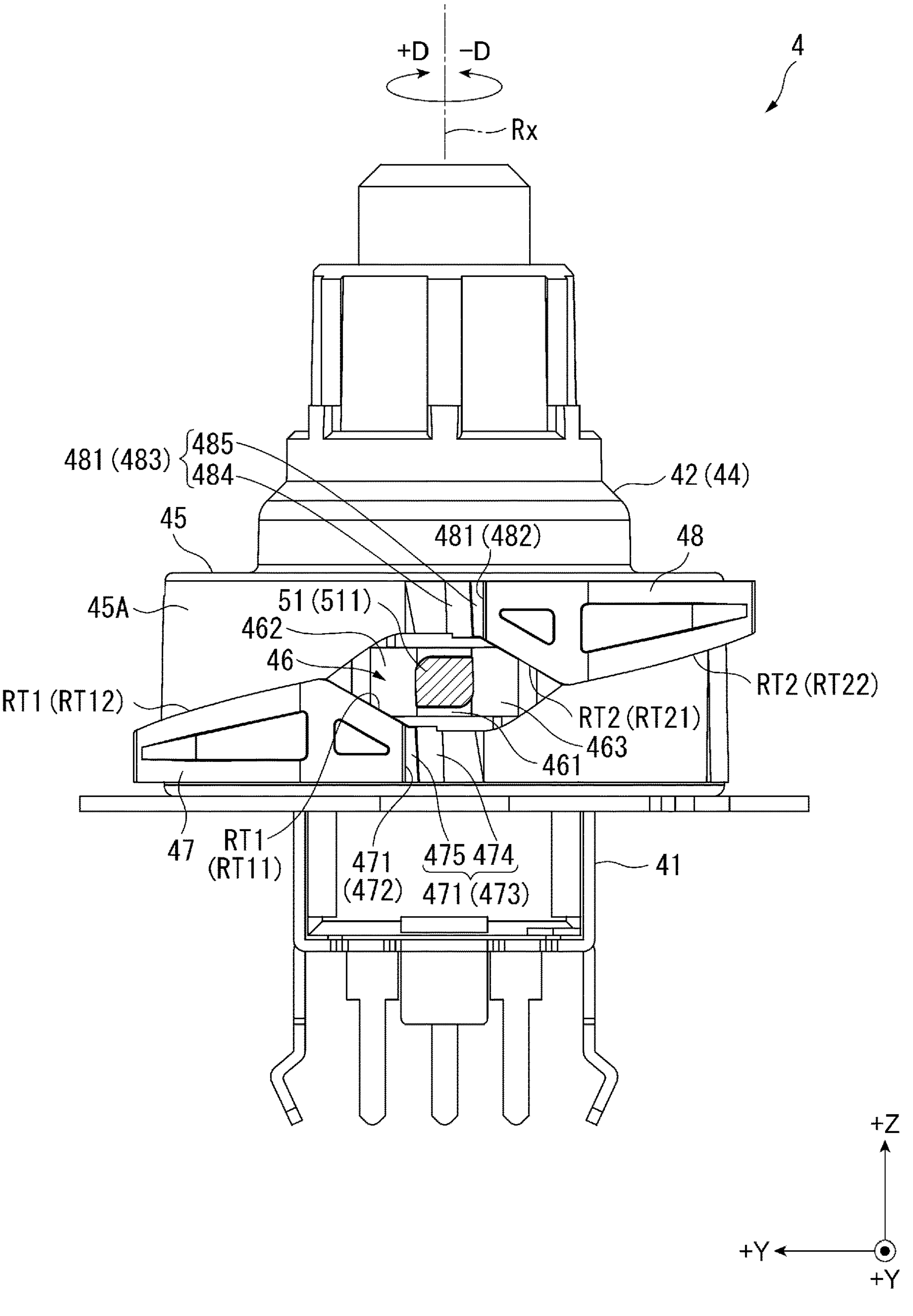
FIG. 8 is a side view of a rotator according to the first exemplary embodiment.

FIG. 8 is a side view of the rotator 42 viewed from the +Y direction.

The contact piece 51 is fitted into the recess 46 when the rotator 42 is located at the reference position. The recess 46 is provided at a center portion in the +Z direction of the cylindrical portion 45. The recess 46 has a bottom 461 and inclined portions 462 and 463.

The bottom 461 is a flat part that is located nearest to the rotation axis Rx in the recess 46. The contact portion 515 (see, FIGS. 9 and 10) that comes into contact with the outer circumferential surface 45A of the contact piece 51 is optionally disposed on the bottom 461.

The inclined portion 462 is disposed in the +D direction with respect to the bottom 461. The inclined portion 462 is inclined to be separated from the rotation axis Rx toward the +D direction. That is, the inclined portion 462 is inclined to be located radially outward about the rotation axis Rx toward the +D direction. When the rotator 42 is rotated in the −D direction, the inclined portion 462 leads, to a first path RT11 of the path forming portion 47, the contact portion 515 that moves relatively in the +D direction with respect to the rotator 42.

The inclined portion 463 is disposed in the −D direction with respect to the bottom 461. The inclined portion 463 is inclined to be separated from the rotation axis Rx toward the −D direction. That is, the inclined portion 463 is inclined to be located radially outward about the rotation axis Rx toward the −D direction. When the rotator 42 is rotated in the +D direction, the inclined portion 463 leads, to a first path RT21 of the path forming portion 48, the contact portion that moves relatively in the −D direction with respect to the rotator 42.

The path forming portions 47 and 48 each protrude radially outward from the outer circumferential surface 45A. The path forming portions 47 and 48 respectively form movement paths RT1 and RT2 of the contact portion 515 (see, FIGS. 9 and 10) when the rotator 42 is rotated. That is, the rotator 42 has a cylindrical cam structure in which the movement paths RT1 and RT2 are provided. The movement paths RT1 and RT2 are each inclined to a circumferential direction about the rotation axis Rx, and each allow the contact piece 51 to move along the rotation axis Rx in accordance with the rotation of the rotator 42.

As illustrated in FIGS. 7 and 8, the path forming portions 47 and 48 are provided to be point-symmetric about the recess 46.

The path forming portion 47 forms the movement path RT1 of the contact portion 515 when the rotator 42 is rotated in a rotation range from the reference position to the rotation limit in the −D direction. The path forming portion 47 is provided continuously with the inclined portion 462. The path forming portion 47 comes into contact with a part in the −Z direction of the contact portion 515.

Hereinafter, the rotation range from the reference position to the rotation limit in the −D direction is referred to as a counterclockwise-side range of the rotator 42. Further, the rotation range from the reference position to the rotation limit in the +D direction is referred to as a clockwise-side range of the rotator 42.

The movement path RT1 includes the first path RT11 and a second path RT12.

The first path RT11 is provided continuously with the inclined portion 462 of the recess 46. The first path RT11 is inclined to be located in the +Z direction toward the +D direction. That is, the first path RT11 is inclined to the circumferential direction about the rotation axis Rx. An end in the +D direction of the first path RT11 is connected to the second path RT12. Thus, when the rotator 42 is rotated in the −D direction, the contact portion 515 moves in the +D direction along the first path RT11 to reach the second path RT12.

The second path RT12 is a path that is inclined to the circumferential direction about the rotation axis Rx to be located in the −Z direction toward the +D direction. The second path RT12 is longer in the +D direction than the first path RT11. That is, the second path RT12 is inclined to the circumferential direction about the rotation axis Rx. When the rotator 42 is most rotated in the −D direction, the contact portion 515 moves further in the +D direction beyond the second path RT12. A position in the +Z direction of the contact piece 51 at this time is the same as a position in the +Z direction of the contact piece 51 when the contact portion 515 is disposed on the bottom 461 owing to biasing force of a first biasing member 52 to be described later.

Further, an end in the +D direction of the path forming portion 47 is disposed in the −Z direction relative to an end in the −Z direction of the contact portion 515 when the rotation axis Rx is set as the center and the contact piece 51 is disposed at a second position. Thus, when the rotator 42 is most rotated in the −D direction and is thereafter rotated in the +D direction, the contact portion 515 comes into contact with a surface in the +Z direction of the path forming portion 47 and is moved along the second path RT12. However, the disclosure is not limited thereto, and when the rotator 42 is most rotated in the −D direction, the contact portion 515 may be disposed at a predetermined part in the second path RT12.

The second path RT12 is provided radially inward about the rotation axis Rx relative to the first path RT11. That is, the second path RT12 is provided at a position closer to the rotation axis Rx than the first path RT11.

When the rotator 42 is rotated in the +D direction in the counterclockwise-side range, the second path RT12 leads the contact portion 515 moving in the −D direction to a restricting portion 481 of the path forming portion 48.

The path forming portion 48 forms a movement path RT2 of the contact portion 515 when the rotator 42 is rotated in a rotation range from the reference position to the rotation limit in the +D direction. The path forming portion 48 is provided continuously with the inclined portion 463. The path forming portion 48 comes into contact with a part in the +Z direction of the contact portion 515.

Hereinafter, a range from the reference position to the rotation limit in the +D direction of the rotator 42 is referred to as a clockwise-side range of the rotator 42.

The movement path RT2 includes the first path RT21 and a second path RT22.

The first path RT21 is provided continuously with the inclined portion 463 of the recess 46. The first path RT21 is inclined to be located in the −Z direction toward the −D direction. That is, the first path RT21 is inclined to the circumferential direction about the rotation axis Rx. An end in the −D direction of the first path RT21 is connected to the second path RT22. Thus, when the rotator 42 is rotated in the +D direction, the contact portion 515 moves in the −D direction along the first path RT21 to reach the second path RT22. The first path RT21 is provided radially outward about the rotation axis Rx relative to the second path RT22.

The second path RT22 is a path that is inclined to the circumferential direction about the rotation axis Rx to be located in the +Z direction toward the −D direction. The second path RT22 is longer in the −D direction than the first path RT21. When the rotator 42 is most rotated in the +D direction, the contact portion 515 moves further in the −D direction beyond the second path RT22. A position in the +Z direction of the contact piece 51 at this time is the same as a position when the contact piece 51 is disposed at the second position owing to the biasing force of the first biasing member 52 to be described later. Further, an end in the −D direction of the path forming portion 48 is disposed in the −Z direction relative to an end in the +Z direction of the contact portion 515 that has the rotation axis Rx as its center and disposed at the second position. Thus, when the rotator 42 is most rotated in the +D direction and is thereafter rotated in the −D direction, the contact portion 515 comes into contact with a surface in the −Z direction of the path forming portion 48 and is moved along the second path RT22. However, the disclosure is not limited thereto, and when the rotator 42 is most rotated in the +D direction, the contact portion 515 may be disposed at a predetermined part in the second path RT22.

When the rotator 42 is rotated in the −D direction in the clockwise-side range, the second path RT22 leads the contact portion 515 moving in the +D direction to the restricting portion 471 of the path forming portion 47.

The path forming portion 47 further includes the restricting portion 471 provided at an end in the −D direction of the path forming portion 47. The restricting portion 471 is provided in the −Z direction with respect to the recess 46.

The restricting portion 471 includes a restricting surface 472 and a guide surface 473.

The restricting surface 472 is substantially perpendicular to the circumferential direction about the rotation axis Rx. When the rotator 42 is rotated in the −D direction and reaches the reference position in the clockwise-side range of the rotator 42, the contact piece 51 moved relatively in the +D direction with respect to the rotator 42 comes into contact with the restricting surface 472. This allows the restricting portion 471 to restrict the contact piece 51 from further moving in the +D direction and to restrict the rotator 42 from rotating in the −D direction from the reference position. A position of the contact piece 51 when the contact portion 515 is brought into contact with the restricting portion 471 is defined as a first position in the clockwise-side range of the rotator 42. The first position in the clockwise-side range is in the −Z direction relative to a position of the contact piece 51 when the contact portion 515 is disposed on the bottom 461. The position of the contact piece 51 when the contact portion 515 is disposed on the bottom 461 is defined as the second position.

The guide surface 473 guides, to the restricting surface 472, the contact piece 51 moved along the movement path RT2 formed by the path forming portion 48 and the outer circumferential surface 45A. The guide surface 473 includes a first guide surface 474 and a second guide surface 475.

The first guide surface 474 is continuous with the second path RT22 and the outer circumferential surface 45A. The first guide surface 474 intersects the circumferential direction about the rotation axis Rx to be located radially outward about the rotation axis Rx toward the +D direction.

The second guide surface 475, which is provided between the first guide surface 474 and the restricting surface 472, is continuous with the first guide surface 474 and the restricting surface 472. The second guide surface 475 intersects the circumferential direction about the rotation axis Rx to be located radially outward about the rotation axis Rx toward the +D direction. An inclination angle of the second guide surface 475 with respect to the circumferential direction about the rotation axis Rx is greater than an inclination angle of the first guide surface 474 with respect to the circumferential direction.

The contact piece 51 that reaches the guide surface 473 from the second path RT22 further moves relatively in the +D direction with respect to the rotator 42, thereby moving along the guide surface 473 in the +Y direction away from the rotator 42, and also reaching a position in contact with the restricting surface 472. When the rotating force in the −D direction applied to the rotator 42 is reduced in this state, the biasing force of the first biasing member 52 to be described later causes the contact portion 515 to move in the +Z direction beyond the path forming portion 48 that forms the second path RT22, and to reach the bottom 461. That is, the contact piece 51 reaches the second position.

As with the path forming portion 47, the path forming portion 48 further includes the restricting portion 481 provided at an end in the +D direction of the path forming portion 48. The restricting portion 481 is provided in the +Z direction with respect to the recess 46.

The restricting portion 481 includes a restricting surface 482 and a guide surface 483.

The restricting surface 482 is substantially perpendicular to the circumferential direction about the rotation axis Rx. When the rotator 42 is rotated in the +D direction and reaches the reference position in the counterclockwise-side range of the rotator 42, the contact piece 51 moved relatively in the −D direction with respect to the rotator 42 comes into contact with the restricting surface 482. This allows the restricting portion 481 to restrict the contact piece 51 from further moving in the −D direction and to restrict the rotator 42 from rotating in the +D direction from the reference position. A position of the contact piece 51 when the contact portion 515 is brought into contact with the restricting portion 481 is defined as a first position in the counterclockwise-side range of the rotator 42. The first position in the counterclockwise-side range is in the +Z direction with respect to the second position.

As with the guide surface 473, the guide surface 483 guides, to the restricting surface 482, the contact piece 51 moved along the movement path RT1 formed by the path forming portion 47 and the outer circumferential surface 45A.

The guide surface 483 includes a first guide surface 484 and a second guide surface 485.

The first guide surface 484 is continuous with the second path RT22 and the outer circumferential surface 45A. The first guide surface 484 intersects the circumferential direction about the rotation axis Rx to be located radially outward about the rotation axis Rx toward the −D direction.

The second guide surface 485, which is provided between the first guide surface 484 and the restricting surface 482, is continuous with the first guide surface 484 and the restricting surface 482. The second guide surface 485 intersects the circumferential direction about the rotation axis Rx to be located radially outward about the rotation axis Rx toward the +D direction. An inclination angle of the second guide surface 485 with respect to the circumferential direction about the rotation axis Rx is greater than an inclination angle of the first guide surface 484 with respect to the circumferential direction.

The contact piece 51 that reaches the guide surface 483 from the second path RT12 further moves relatively in the −D direction with respect to the rotator 42, thereby moving along the guide surface 483 in the +Y direction away from the rotator 42, and also reaching a position in contact with restricting surface 482. When the rotating force in the +D direction applied to the rotator 42 is reduced in this state, the biasing force of the first biasing member 52 to be described later causes the contact portion 515 to move in the −Z direction beyond the path forming portion 47 that forms the second path RT12, and to reach the bottom 461. That is, the contact piece 51 reaches the second position.

As described above, the movement paths RT1 and RT2 are provided for the outer circumferential surface 45A of the rotator 42. The movement paths RT1 and RT2 are each inclined to the circumferential direction about the rotation axis Rx. The rotator 42 is rotated about the rotation axis Rx. The contact portion 515 that moves along the movement paths RT1 and RT2 will be described in detail later.

Configuration of Restriction Switching Mechanism

Figure 9:
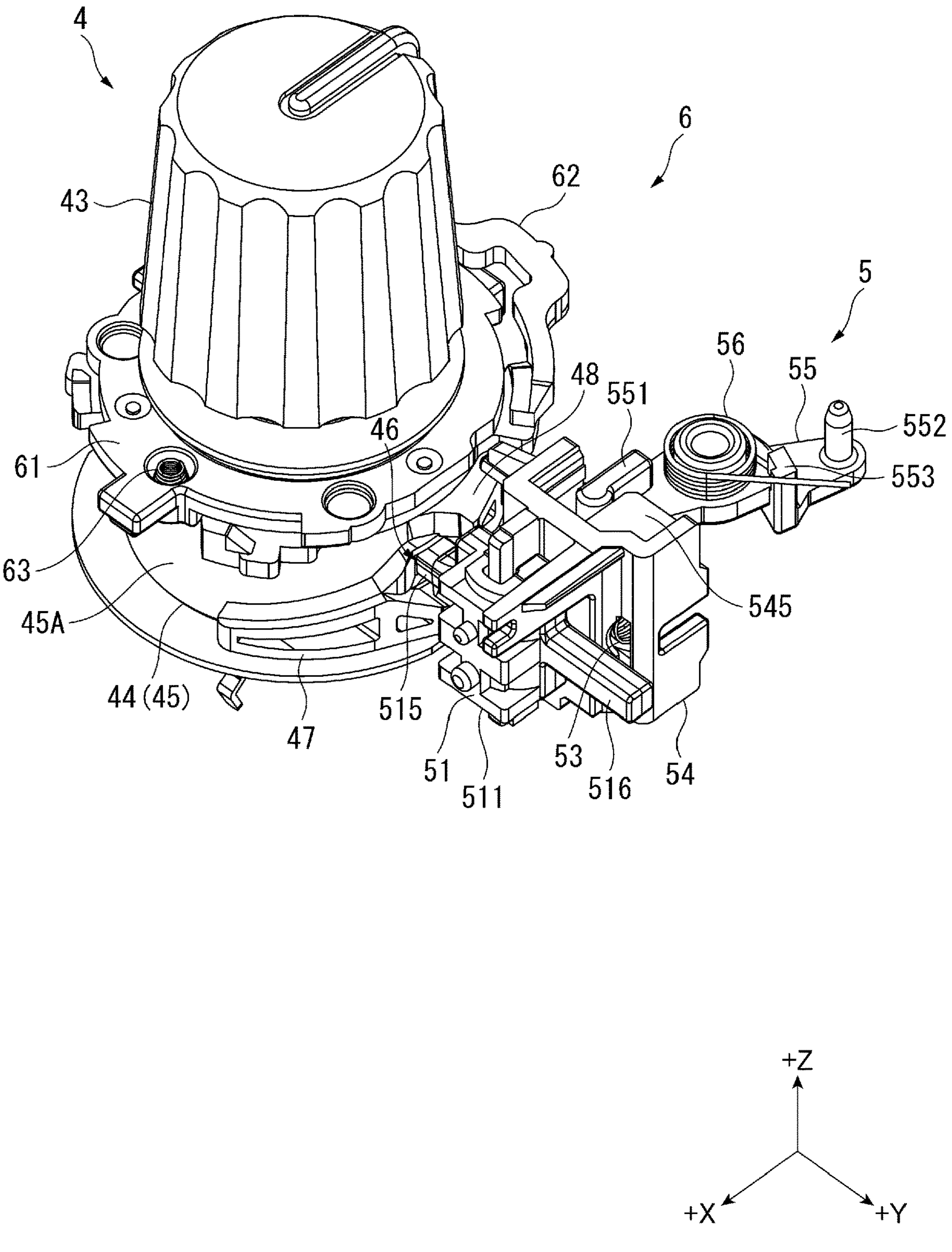
FIG. 9 is a perspective view of a restriction switching mechanism according to the first exemplary embodiment.
Figure 10:
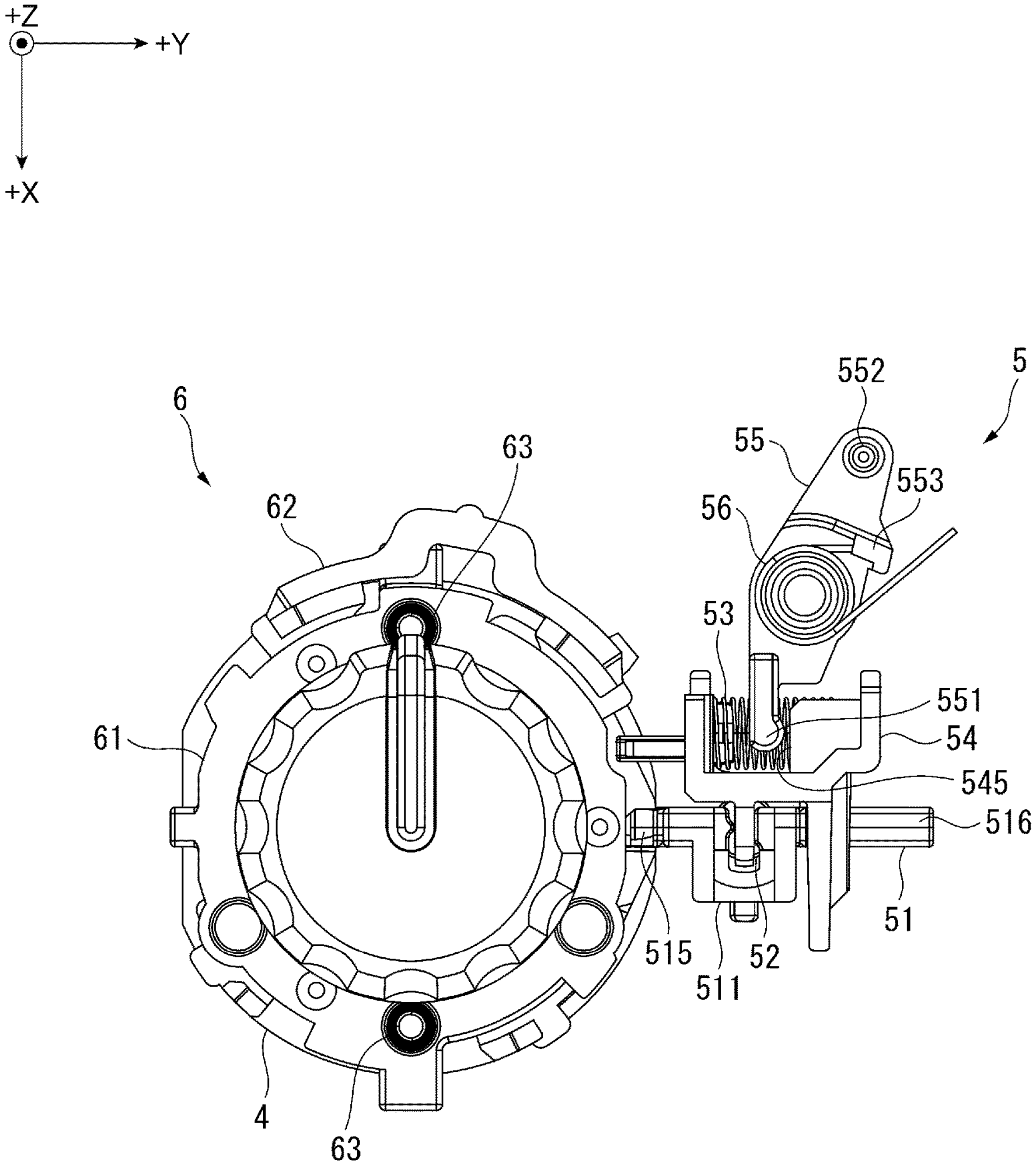
FIG. 10 is a plan view of the restriction switching mechanism according to the first exemplary embodiment.

FIG. 9 is a perspective view of the restriction switching mechanism 5, and FIG. 10 is a plan view of the restriction switching mechanism 5 viewed from the +Z direction. It is to be noted that FIGS. 9 and 10 each illustrate the restriction switching mechanism 5 engaged with the operator body 4.

In response to the switching operation on the state switching mechanism 7, the restriction switching mechanism 5 performs switching between a restricted state where the rotation of the rotator 42 is restricted by the restricting portions 471 and 481 and an unrestricted state where the rotation of the rotator 42 is not restricted. That is, the restriction switching mechanism 5 performs switching between the restricted state where the rotation of the rotator 42 is restricted at the reference position and the unrestricted state where the rotation of the rotator 42 is not restricted at the reference position.

As illustrated in FIGS. 9 and 10, the restriction switching mechanism 5 includes the contact piece 51, the first biasing member 52, the second biasing member 53, the holding member 54, the switching member 55, and the third biasing member 56.

Configuration of Contact Piece

Figure 11:
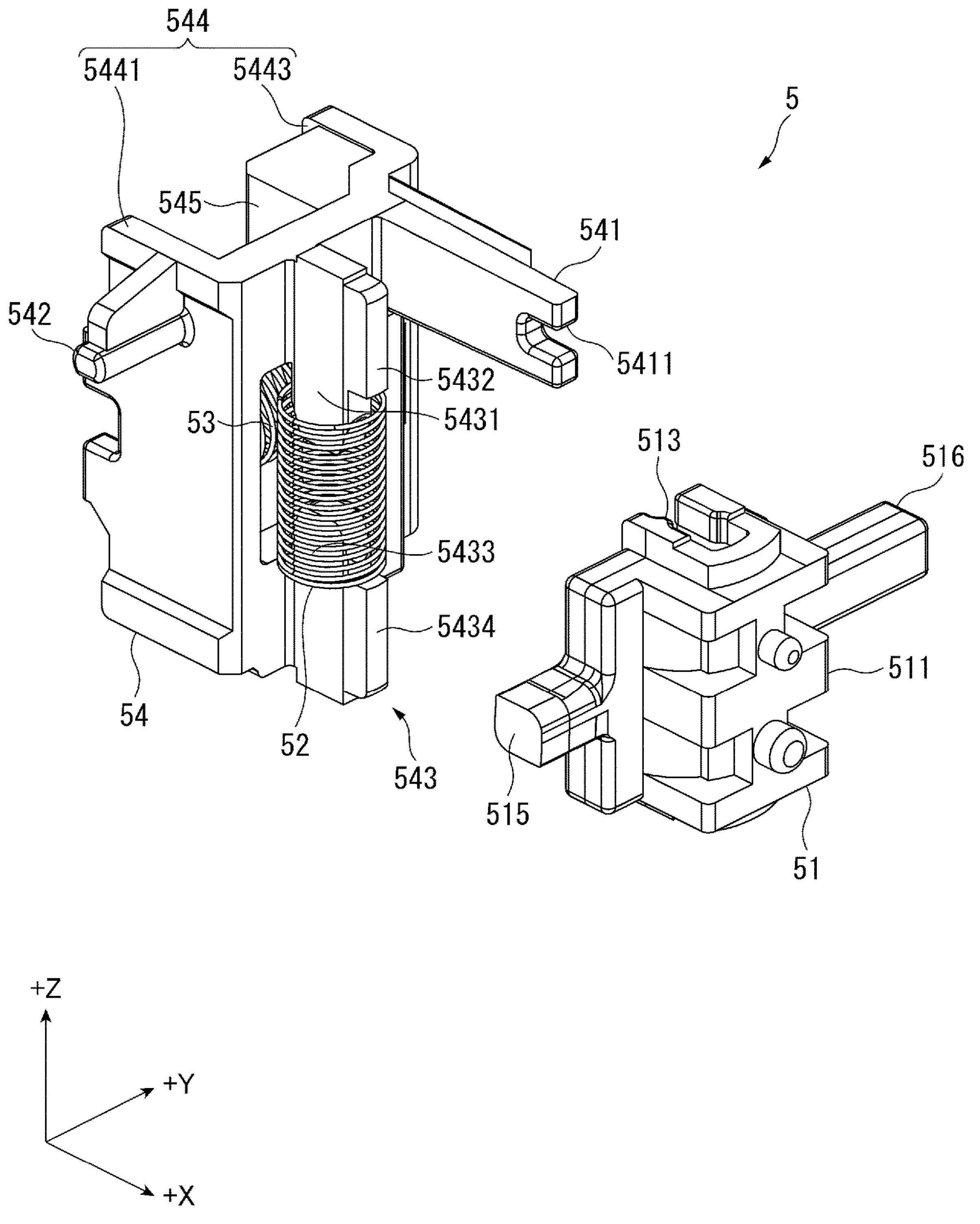
FIG. 11 is an exploded perspective view of the restriction switching mechanism according to the first exemplary embodiment.
Figure 12:
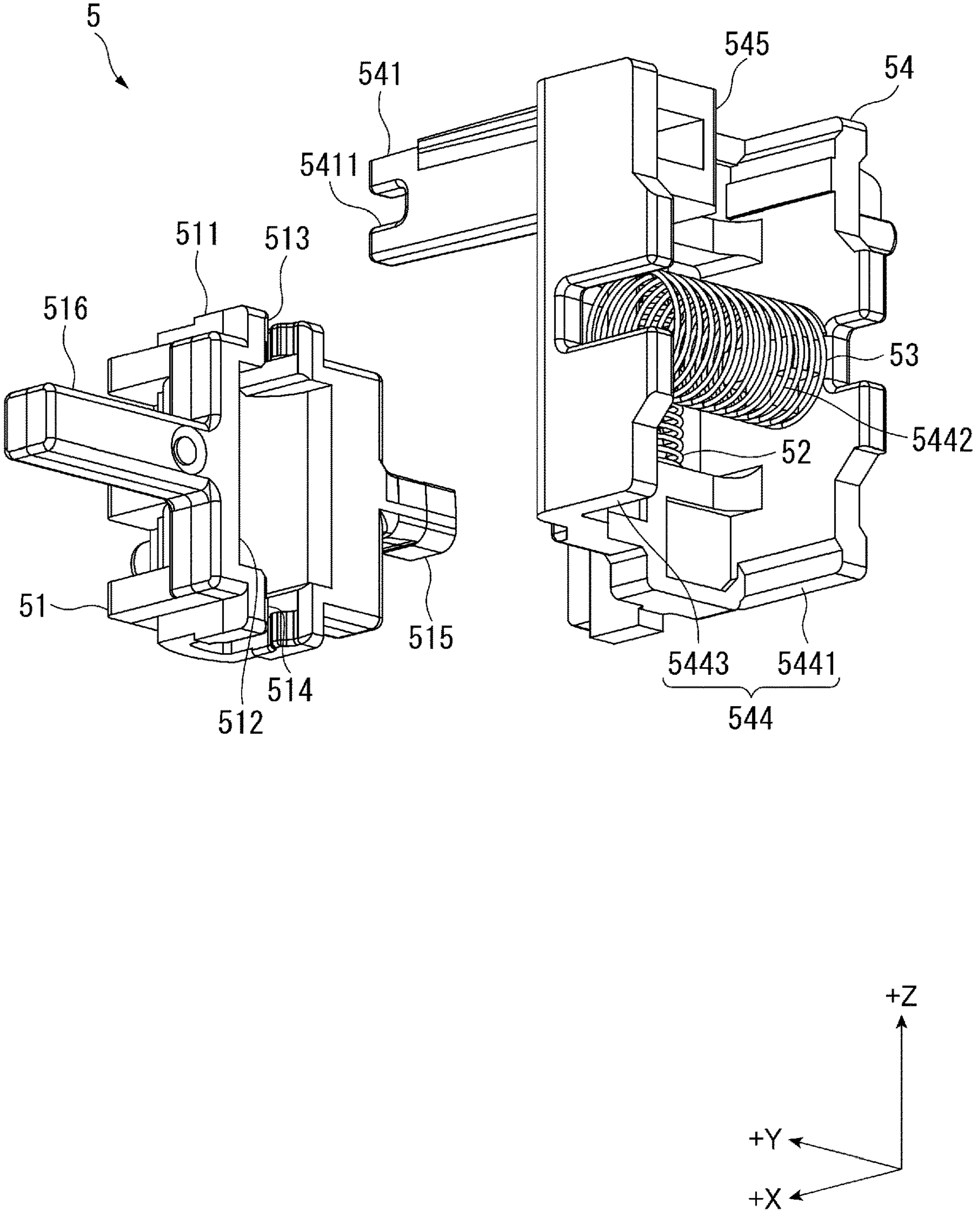
FIG. 12 is an exploded perspective view of the restriction switching mechanism according to the first exemplary embodiment.

FIG. 11 is an exploded perspective view of the restriction switching mechanism 5 viewed from the +X direction and the −Y direction. FIG. 12 is an exploded perspective view of the restriction switching mechanism 5 viewed from the −X direction and the +Y direction. In FIGS. 11 and 12, illustrations of the switching member 55 and the third biasing member 56 are omitted.

The contact piece 51, which is provided to be accessible to the rotator 42, comes into contact with the restricting portions 471 and 481 to restrict the rotation of the rotator 42. The contact piece 51 moves relatively in the ±D directions with respect to the rotator 42 along the movement paths RT1 and RT2, in association with the rotation of the rotator 42. Further, the contact piece 51 moves in the ±Z directions along the movement paths RT1 and RT2, in association with the rotation of the rotator 42. The +Z direction and the −Z direction are each a direction along the rotation axis Rx.

As illustrated in FIGS. 11 and 12, the contact piece 51 has a substantially cross shape as viewed from the +X direction. The contact piece 51 includes a contact piece body 511, the contact portion 515, and a protrusion 516.

The contact piece body 511 has a substantially rectangular shape as viewed from the +X direction or the −X direction. As illustrated in FIG. 12, the contact piece body 511 includes an arrangement portion 512 having a substantially rectangular shape that is long in the +Y direction, and to-be-inserted portions 513 and 514 provided continuously with the arrangement portion 512.

The arrangement portion 512 is a recess that is open in the −X direction. When the contact piece 51 and the holding member 54 are combined, the first biasing member 52 included in the holding member 54 is disposed inside the arrangement portion 512.

The to-be-inserted portion 513 is provided in the +Z direction with respect to the arrangement portion 512. The to-be-inserted portion 513 is open in the −X direction and also in the +Z direction, and is provided continuously with the arrangement portion 512. Into the to-be-inserted portion 513, a first locking portion 5432 of the holding member 54 is to be inserted.

The to-be-inserted portion 514 is provided in the −Z direction with respect to the arrangement portion 512. The to-be-inserted portion 514 is open in the −X direction and also in the −Z direction, and is provided continuously with the arrangement portion 512. Into the to-be-inserted portion 514, a second locking portion 5434 of the holding member 54 is to be inserted.

The contact portion 515 is a substantially quadrangular prism-shaped part protruding from the contact piece body 511 in the −Y direction. The contact portion 515 is inserted through the guide hole 343 (see FIG. 5) provided in the casing 3 and comes into contact with the outer circumferential surface 45A of the rotator 42. That is, an end surface in the −Y direction of the contact portion 515 is a contact surface of the contact piece 51 that is accessible to the outer circumferential surface 45A.

The protrusion 516 is a substantially quadrangular prism-shaped part protruding from the contact piece body 511 in the +Y direction. The protrusion 516 is inserted through the guide 344 (see, FIG. 5) provided in the casing 3 along the +Y direction. The contact portion 515 is inserted through the guide hole 343 and the protrusion 516 is inserted through the guide 344, which restricts the contact piece 51 from rotating together with the rotator 42, and moves the contact piece 51 in the +Z direction or the −Z direction in association with the rotation of the rotator 42.

Configuration of First Biasing Member

As illustrated in FIG. 11, the first biasing member 52 is provided in the holding member 54. The first biasing member 52 biases the contact piece 51 in the +Z direction and the −Z direction to maintain the contact piece 51 at the same position as the second position in the +Z direction. More specifically, when the contact portion 515 is located in the +Z direction relative to the recess 46, the first biasing member 52 biases the contact piece 51 in the −Z direction. When the contact portion 515 is located in the −Z direction relative to the recess 46, the first biasing member 52 biases the contact piece 51 in the +Z direction. That is, the first biasing member 52 biases the contact piece 51 in the −Z direction that is a direction from the first position toward the second position in the counterclockwise-side range, and also biases the contact piece 51 in the +Z direction that is a direction from the first position toward the second position in the clockwise-side range.

In the exemplary embodiment, the first biasing member 52 is in a form of a compression coil spring.

Configuration of Second Biasing Member

As illustrated in FIG. 12, the second biasing member 53 is provided in the holding member 54. The second biasing member 53 biases the contact piece 51 in the −Y direction via the holding member 54. That is, the second biasing member 53 biases the contact piece 51 in a direction toward the rotation axis Rx of the rotator 42 via the holding member 54.

In the exemplary embodiment, the second biasing member 53 is in a form of a compression coil spring. The end in the +Y direction of the second biasing member 53 is held by the holding portion 341 (see, FIG. 6) of the casing 3, and an end in the −Y direction of the second biasing member 53 is held by a second holding portion 544 of the holding member 54.

Configuration of Holding Member

The holding member 54 holds the first biasing member 52 and the second biasing member 53, and causes the biasing force of the first biasing member 52 and the biasing force of the second biasing member 53 to act on the contact piece 51. Specifically, the holding member 54 maintains a position of the contact piece 51 such that the contact portion 515 is disposed at the same position as the recess 46 in the +Z direction owing to the biasing force of the first biasing member 52. Further, the holding member 54 maintains a state where the contact portion 515 is in contact with the outer circumferential surface 45A owing to the biasing force of the second biasing member 53.

As illustrated in FIGS. 11 and 12, the holding member 54 includes a first protrusion 541, a second protrusion 542, a first holding portion 543, the second holding portion 544, and a to-be-pressed portion 545.

The first protrusion 541 protrudes in the +X direction from an end in the +Z direction of the holding member 54. On an end surface in the +X direction of the first protrusion 541, a recess 5411 recessed in the −X direction is provided. In the recess 5411, an unillustrated protrusion of the casing 3 is inserted, whereby sliding of the holding member 54 in the ±Y directions is guided, and the holding member 54 is prevented from moving in the ±Z directions.

The second protrusion 542 protrudes in the −Y direction from the end in the +Z direction of the holding member 54. The second protrusion 542 is inserted into an unillustrated recess of the casing 3.

The first holding portion 543 holds the first biasing member 52. As illustrated in FIG. 11, the first holding portion 543 includes a first holding piece 5431, the first locking portion 5432, a second holding piece 5433, and the second locking portion 5434.

The first holding piece 5431 and the second holding piece 5433 are provided in a part in the +X direction of the holding member 54, the holding pieces 5431 and 5433 being separated from each other in the +Z direction. The first holding piece 5431 is separated in the +Z direction from the second holding piece 5433.

The first holding piece 5431 is inserted in an end in the +Z direction of the first biasing member 52, and the second holding piece 5433 is inserted in an end in the −Z direction of the first biasing member 52.

Figure 13:
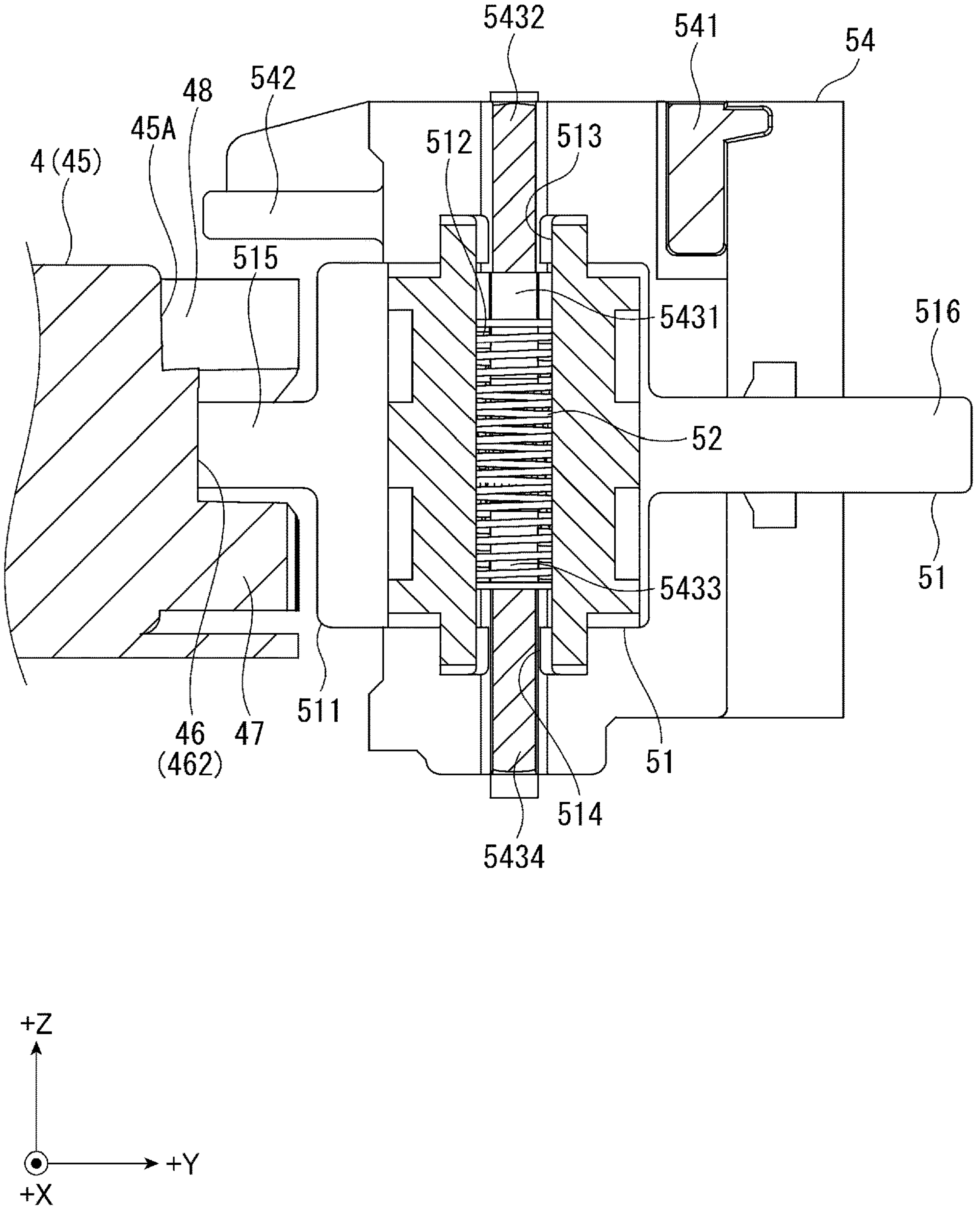
FIG. 13 is a cross-sectional view of the rotator and the restriction switching mechanism according to the first exemplary embodiment.

FIG. 13 illustrates a cross section along a YZ plane of the rotator 42 and the restriction switching mechanism 5.

As illustrated in FIG. 11, the first locking portion 5432 protrudes in the +X direction from a part in the +Z direction of the first holding piece 5431. The second locking portion 5434 protrudes in the +X direction from a part in the −Z direction of the second holding piece 5433.

As illustrated in FIG. 13, when the contact piece 51 is moved in the +Z direction, the end in the +Z direction of the first biasing member 52 abuts against a surface in the −Z direction of the first locking portion 5432, and the first locking portion 5432 locks the first biasing member 52. This restricts the first biasing member 52 from moving together with the contact piece 51 in the +Z direction, and causes the first biasing member 52 to generate the biasing force to bias the contact piece 51 in the −Z direction. That is, when the contact piece 51 moves in the +Z direction, the first biasing member 52 biases the contact piece 51 in the −Z direction.

When contact piece 51 is moved in the −Z direction, the end in the −Z direction of the first biasing member 52 abuts against a surface in the +Z direction of the second locking portion 5434, and the second locking portion 5434 locks the first biasing member 52. This restricts the first biasing member 52 from moving together with the contact piece 51 in the −Z direction, and causes the first biasing member 52 to generate the biasing force to bias the contact piece 51 in the +Z direction. That is, when the contact piece 51 moves in the −Z direction, the first biasing member 52 biases the contact piece 51 in the +Z direction.

As illustrated in FIG. 12, the second holding portion 544 holds the second biasing member 53. The second holding portion 544 includes a first wall portion 5441 and a second wall portion 5443 opposed to each other in the +Y direction.

The first wall portion 5441 includes an insertion portion 5442 to be inserted into an end in the −Y direction of the second biasing member 53 disposed along the +Y direction.

The second wall portion 5443 is provided in the +Y direction with respect to the first wall portion 5441. The holding portion 341 of the casing 3 (see, FIG. 6) is disposed between the first wall portion 5441 and the second wall portion 5443 in the +Y direction. As described above, an end in the −Y direction of the holding portion 341 locks the end in the +Y direction of the second biasing member 53.

In this manner, the end in the −Y direction of the second biasing member 53 is locked to the first wall portion 5441 in a state where the end in the +Y direction of the second biasing member 53 is in contact with the casing 3. Thus, the holding member 54 and the contact piece 51 are biased in the Y direction by the second biasing member 53. That is, the holding member 54 and the contact piece 51 are biased by the second biasing member 53 toward the rotation axis Rx of the rotator 42.

As illustrated in FIGS. 10 to 12, the to-be-pressed portion 545 is provided on a surface in the −Y direction of the second wall portion 5443. The to-be-pressed portion 545 is pressed in the +Y direction by the switching member 55 rotated counterclockwise as viewed from the +Z direction. At this time, the holding member 54 is moved in the +Y direction against the biasing force of the second biasing member 53, and thus the contact piece 51 is moved in the +Y direction. As a result, it is possible to cause the contact piece 51 to be separated from the rotator 42 to such an extent that the contact portion 515 does not come into contact with the rotator 42, and to switch the state of the rotator 42 to the unrestricted state where the rotation of the rotator 42 is not restricted at the reference position.

Configuration of Switching Member

The switching member 55 switches the position of the contact piece 51 in association with sliding of a slide member 72 to be described later, between: a position at which the contact piece 51 is accessible to the rotator 42 of the rotary operator 2; and a position at which the contact piece 51 is not accessible to the rotator 42 of the rotary operator 2. As illustrated in FIGS. 9 and 10, the switching member 55 is a lever that is supported by the lever support 35 (see, FIGS. 5 and 6) of the casing 3 such that the switching member 55 is rotatable clockwise and counterclockwise as viewed from the +Z direction. The switching member 55 rotates in association with the sliding of the slide member 72 to switch the position of the contact piece 51. The switching member 55 includes a pressing portion 551, an engagement portion 552, and a locking portion 553.

The pressing portion 551 presses the to-be-pressed portion 545 in the +Y direction to separate the contact piece 51 from the rotator 42 when the switching member 55 rotates counterclockwise as viewed from the +Z direction.

The engagement portion 552 engages with the slide member 72 of the state switching mechanism 7 to be described below. The engagement portion 552 is provided on an end of the switching member 55 opposite to an end on which the pressing portion 551 is provided. The engagement portion 552 is a cylindrical boss that protrudes in the −Z direction.

The locking portion 553 locks an end of the third biasing member 56.

Configuration of Third Biasing Member

The third biasing member 56 is the torsion coil spring provided in the lever support 35 (see, FIGS. 5 and 6). One end of the third biasing member 56 is locked by the locking portion 36 (see, FIGS. 5 and 6) and the other end of the third biasing member 56 is locked to the locking portion 553 of the switching member 55.

The third biasing member 56 biases the switching member 55 counterclockwise as viewed from the +Z direction. The switching member 55 rotated counterclockwise presses the holding member 54 in the +Y direction, and thus the contact piece 51 is separated in the +Y direction from the rotator 42, as described above. That is, the third biasing member 56 biases the contact piece 51 in the +Y direction away from the rotator 42.

In contrast, when the slide member 72 to be described later of the state switching mechanism 7 is slid in the +Y direction, the slide member 72 causes the switching member 55 to rotate clockwise as viewed from the +Z direction against the biasing force of the third biasing member 56. Thus, the pressing portion 551 is separated from the to-be-pressed portion 545, the holding member 54 and the contact piece 51 become movable in the −Y direction owing to the biasing force of the second biasing member 53, and the contact portion 515 comes into contact with the cylindrical portion 45 of the rotator 42.

Restriction on Rotation of Rotator by Contact Piece

Figure 14:
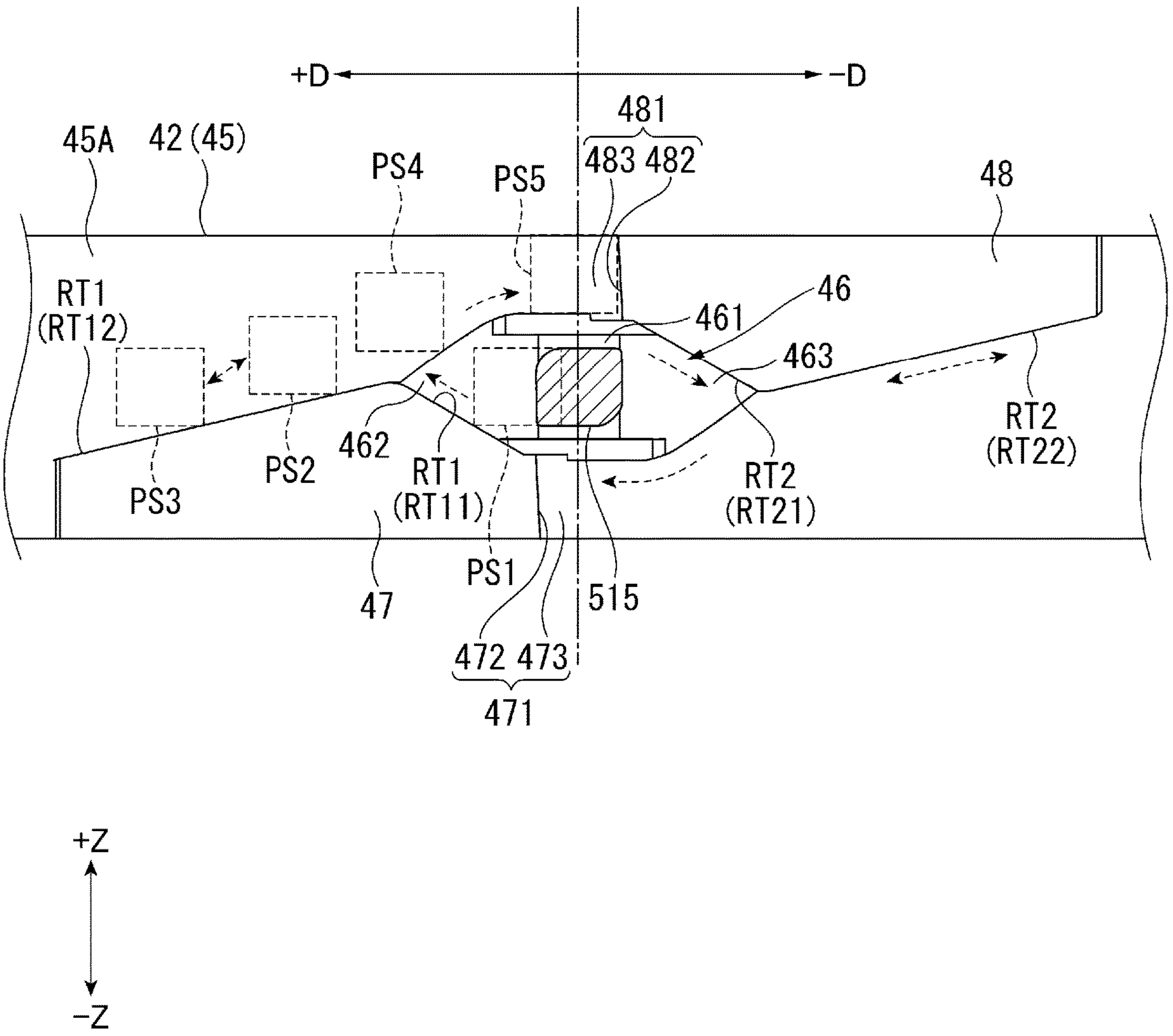
FIG. 14 schematically illustrates a position of a contact portion when the rotator according to the first exemplary embodiment is rotated in a counterclockwise-side range.

FIG. 14 schematically illustrates a position of the contact portion 515 when the rotator 42 is rotated in the counterclockwise-side range.

When the rotator 42 is located at the reference position, the contact piece 51 is disposed at the second position where the contact portion 515 is disposed on the bottom 461. When the rotator 42 is rotated in the −D direction from the state where the rotator 42 is disposed at the reference position, the contact portion 515 reaches the first path RT11 from the bottom 461 via the inclined portion 462, as indicated by a position PS1 in FIG. 14.

In a state where the contact portion 515 is located on the inclined portion 462 or the first path RT11, when the rotator 42 is rotated in the +D direction and the contact portion 515 moves relatively in the −D direction, the contact portion 515 returns to the bottom 461.

When the rotator 42 is rotated further in the −D direction in a state where the contact portion 515 is disposed on the first path RT11, the contact portion 515 reaches the second path RT12 from the first path RT11, as indicated by a position PS2 in FIG. 14, for example. At this time, the biasing force in the −Z direction by the first biasing member 52 acts on the contact piece 51, and the contact portion 515 is pressed in the −Z direction against the path forming portion 47.

When the rotator 42 is rotated in the −D direction in a state where the contact portion 515 is disposed on the second path RT12, the contact portion 515 moves relatively in the +D direction with respect to the rotator 42 along the second path RT12, as indicated by a position PS3 in FIG. 14, for example. Similarly, when the rotator 42 is rotated in the +D direction in the state where the contact portion 515 is disposed on the second path RT12, the contact portion 515 is moved relatively in the −D direction with respect to the rotator 42 along the second path RT12.

At this time, when the contact portion 515 is disposed in the +Z direction relative to the bottom 461, the first biasing member 52 applies the biasing force in the −Z direction to the contact portion 515. That is, when the contact piece 51 is disposed in the +Z direction relative to the second reference position, the first biasing member 52 applies the biasing force in the −Z direction to the contact piece 51.

In contrast, when the contact portion 515 is located in the −Z direction relative to the bottom 461, the first biasing member 52 applies the biasing force in the +Z direction to the contact portion 515. That is, when the contact piece 51 is disposed in the −Z direction relative to the second reference position, the first biasing member 52 applies the biasing force in the +Z direction to the contact piece 51.

Although not illustrated in the drawings, when the contact portion 515 reaches the rotation limit in the +D direction, the contact portion 515 is disposed in the +D direction with respect to the path forming portion 47. A position of the contact piece 51 in the +Z direction in this case is the same as the second position. Specifically, when the contact portion 515 is moved in the +D direction along the second path RT12, and the position in the +Z direction of the contact portion 515 reaches a position that is the same as the position of the contact portion 515 in the case of the second position, the contact portion 515 is moved, in association with the rotation of the rotator 42 in the −D direction, in the +D direction while being separated from the path forming portion 47. That is, a path between the position at which the contact portion 515 is separated from the path forming portion 47 and the rotation limit in the +D direction of the contact portion 515 on the second path RT12 is along the circumferential direction about the rotation axis Rx.

Here, the second path RT12 is provided at a position closer to the rotation axis Rx than the first path RT11. Thus, when reaching the second path RT12 from the first path RT11, the contact piece 51 moves in the −Y direction that is slightly on a side of the rotation axis Rx owing to the biasing force of the second biasing member 53. In this configuration, when the rotator 42 is rotated in the +D direction in a state where the contact portion 515 is disposed on the second path RT12, the movement of the contact piece 51 from the second path RT12 to the first path RT11 is restricted, and the movement of the contact piece 51 along the second path RT12 is allowed. Accordingly, when the rotator 42 is rotated in the +D direction, the contact portion 515 reaches a position PS4 in FIG. 14, for example.

When the rotator 42 is rotated in the +D direction in a state where the contact portion 515 is disposed on the second path RT12 and reaches the guide surface 483, the contact piece 51 is moved by the guide surface 483 in the +Y direction away from the rotator 42.

When the rotator 42 is further rotated in the +D direction to reach the reference position, the contact portion 515 comes into contact with the restricting surface 482, as indicated by a position PS5 in FIG. 14. The position PS5 at which the contact portion 515 is in contact with the restricting portion 481 is the first position in the counterclockwise-side range described above. This restricts the movement in the −D direction of the contact portion 515 relative to the rotator 42, and restricts the rotation of the rotator 42 in the +D direction.

In a state where the contact piece 51 is disposed at the first position, the end surface in the −Y direction of the contact portion 515 is disposed in the +Y direction relative to the path forming portion 47. The contact piece 51 is thus movable beyond the path forming portion 47 in a direction from the first position toward the second position, i.e., in the −Z direction. In this configuration, for example, when the user releases his or her hand from the knob 43 to reduce the rotating force in the +D direction with respect to the rotator 42, the contact portion 515 moves in the −Z direction owing to the biasing force of the first biasing member 52 and returns to the bottom 461. That is, the contact piece 51 returns to the second position.

This allows the contact portion 515 to move relatively in the ±D directions with respect to the rotator 42, thereby allowing the rotator 42 to rotate in the ±D directions.

When the rotator 42 is rotated in the +D direction in the state where the contact piece 51 is disposed at the second position where the contact portion 515 is located on the bottom 461, the contact portion 515 moves relatively in the −D direction with respect to the rotator 42 along the inclined portion 463, and moves relatively with respect to the rotator 42 along the first path RT21 and the second path RT22. When the rotator 42 is rotated in the −D direction and the contact portion 515 moved along the second path RT22 and the guide surface 473 reaches the restricting portion 471, the restricting portion 471 restricts the rotation in the −D direction of the rotator 42. The position of the contact piece 51 when the contact portion 515 comes into contact with the restricting portion 471 is the first position in the clockwise-side range described above.

When the rotating force in the −D direction applied to the rotator 42 is reduced in this state, the contact portion 515 moves in the +Z direction owing to the biasing force of the first biasing member 52 and the contact piece 51 returns to the second position.

This allows the contact portion 515 to move relatively in the ±D directions with respect to the rotator 42, thereby allowing the rotator 42 to rotate in the ±D directions.

Here, the contact piece 51 moves in the +Y direction as the contact piece 51 moves in the +D direction along the guide surface 473. Thus, when the contact piece 51 is disposed at the first position that is in contact with the restricting portion 471, the contact piece 51 is movable beyond the path forming portion 47 from the first position to the second position.

Similarly, the contact piece 51 moves in the +Y direction as the contact piece 51 moves in the −D direction along the guide surface 483. Thus, when the contact piece 51 is disposed at the first position that is in contact with the restricting portion 481, the contact piece 51 is movable beyond the path forming portion 48 from the first position to the second position.

Figure 15:
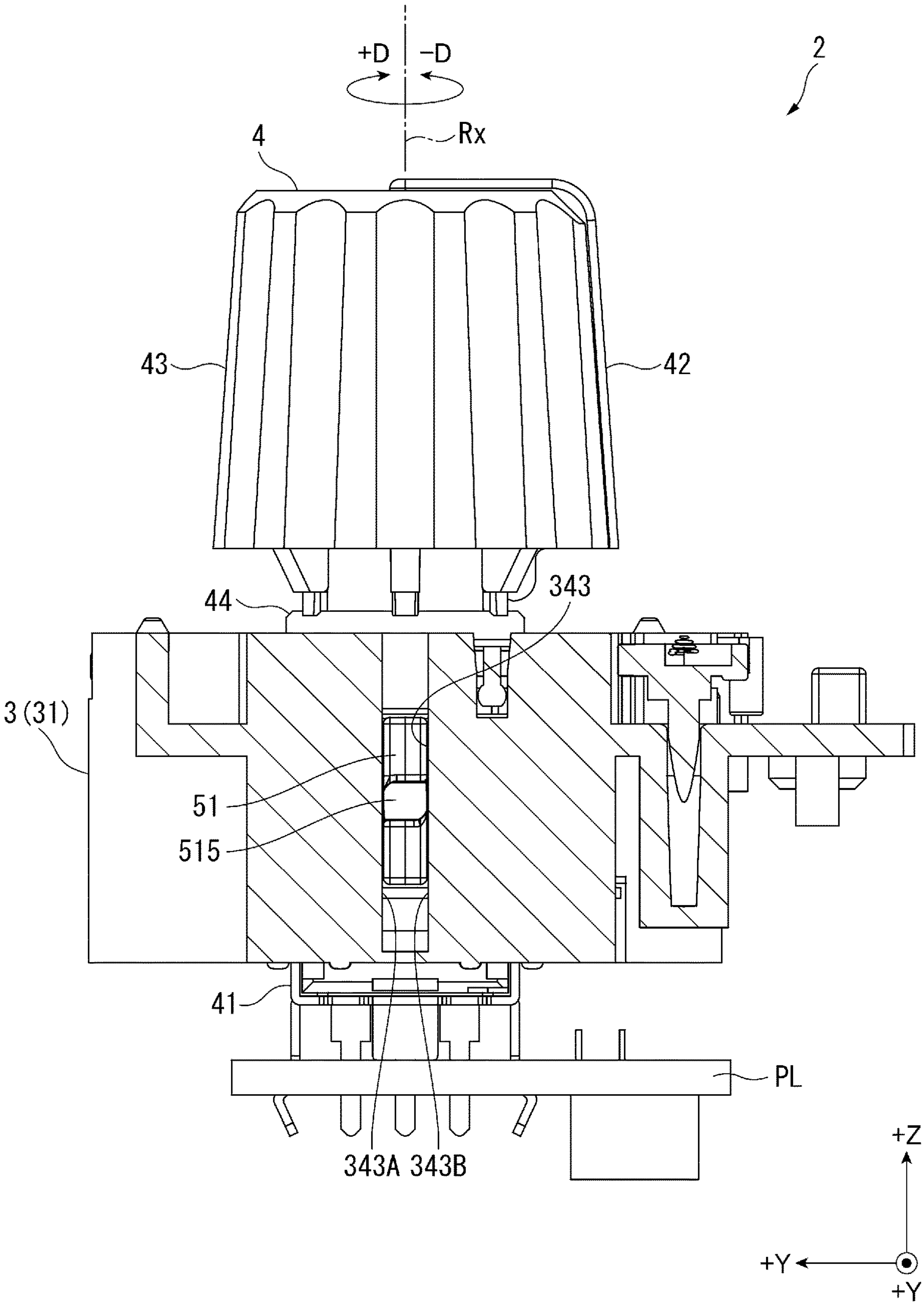
FIG. 15 is a cross-sectional view of the rotary operator according to the first exemplary embodiment.

FIG. 15 illustrates a cross section along an XZ plane of the rotary operator 2 taken along a position of the contact portion 515 that is inserted through the guide hole 343 in the −Y direction. In other words, FIG. 15 illustrates a cross section of the rotary operator 2 taken along a line XV-XV indicated in FIG. 5. In FIG. 15, the contact piece 51 is disposed at the second position.

However, upon the rotation in the +D direction of the rotator 42 in the counterclockwise-side range, the contact piece 51 is pushed out in the +Y direction by the guide surface 473, and is simultaneously pressed against an inner surface 343A provided in the +X direction of the guide hole 343 as illustrated in FIG. 15. Further, upon the rotation in the −D direction of the rotator 42 in the clockwise-side range, the contact piece 51 is pushed out in the +Y direction by the guide surface 483, and is simultaneously pressed against an inner surface 343B provided in the −X direction of the guide hole 343. The contact portion 515 is thus in a state of being caught between the guide surface 473 and the inner surface 3438, or in a state of being caught between the guide surface 483 and the inner surface 343A. In this case, it is difficult for the contact piece 51 to move from the first position to the second position.

Whether or not the contact piece 51 moves to the second position while being pushed out in the +Y direction by the guide surface 473 or the guide surface 483 depends on a balance between the biasing force of the first biasing member 52 and the biasing force of the second biasing member 53.

For example, setting the biasing force of the first biasing member 52 to be lower than a first threshold and setting the biasing force of the second biasing member 53 to be higher than a second threshold make it possible to configure the rotary operator 2 such that no movement toward the second position is generated during the rotation of the rotator 42, i.e., when a torque that makes the rotator 42 rotatable is applied to the knob 43.

Further, for example, setting the biasing force of the first biasing member 52 to be higher than the first threshold and setting the biasing force of the second biasing member 53 to be lower than the second threshold make it possible to configure the rotary operator 2 such that the contact piece 51 reaches the second position prior to reaching the restricting surface 472 or the restricting surface 482, unless the rotator 42 is rotated above a predetermined rotation rate. In this case, the rotary operator 2 can be configured such that: the restricting surface 472 does not restrict the movement of the contact piece 51 in the +D direction, i.e., the rotation of the rotator 42 in the −D direction; and the restricting surface 482 does not restrict the movement of the contact piece 51 in the −D direction, i.e., the rotation of the rotator 42 in the +D direction.

Configuration of Operational-Feeling Switching Mechanism

Figure 16:
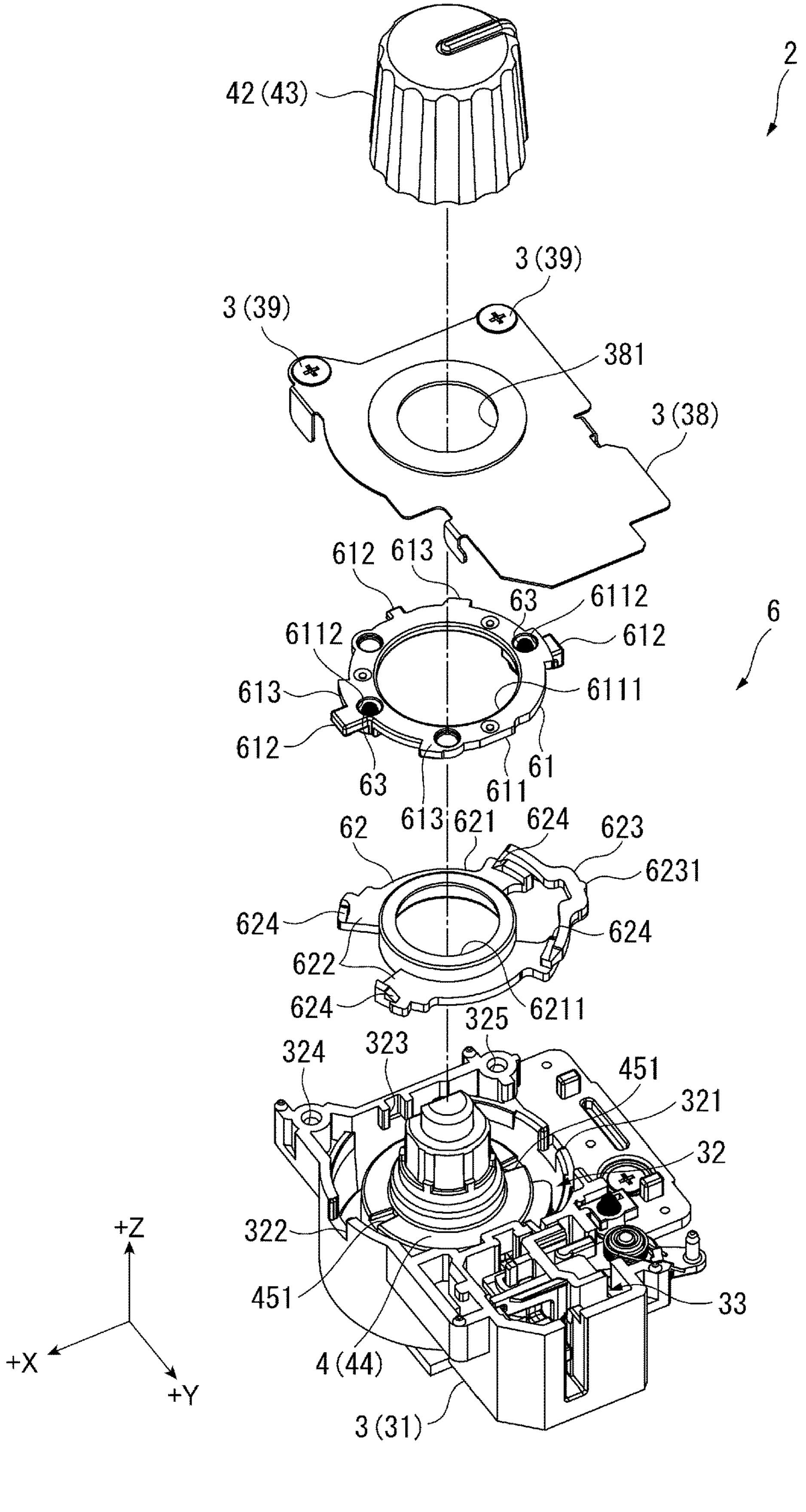
FIG. 16 is an exploded perspective view of the operator body and an operational-feeling switching mechanism according to the first exemplary embodiment.
Figure 17:
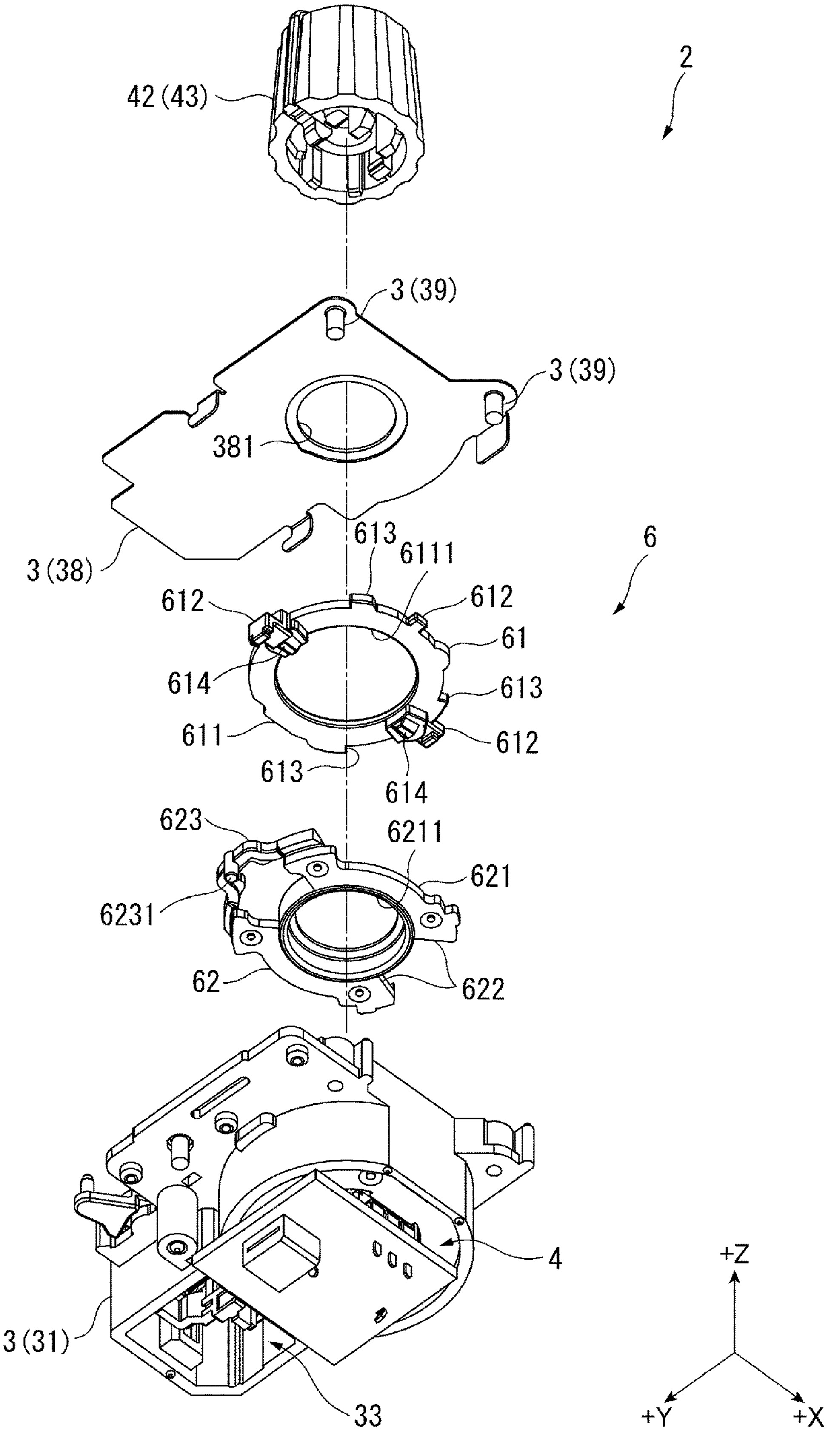
FIG. 17 is an exploded perspective view of the operator body and the operational-feeling switching mechanism according to the first exemplary embodiment.

FIGS. 16 and 17 are each an exploded perspective view of the operator body 4 and the operational-feeling switching mechanism 6. Specifically, FIG. 16 is the exploded perspective view of the operator body 4 and the operational-feeling switching mechanism 6 viewed from the +Z direction, and FIG. 17 is the exploded perspective view of the operator body 4 and the operational-feeling switching mechanism 6 viewed from the −Z direction.

The operational-feeling switching mechanism 6 switches the operational feelings of the rotary operator 2 in response to the switching operation on the state switching mechanism 7 to be described later, along with the switching of the operation modes performed by the state switching mechanism 7. In the exemplary embodiment, the operational feelings are clicking feelings, and the operational-feeling switching mechanism 6 performs switching between a state where a clicking feeling occurs when the rotator 42 is rotated and a state where no clicking feeling occurs when the rotator 42 is rotated.

The operational-feeling switching mechanism 6 is provided between the cover 38 and the cylindrical portion 45 of the rotator 42 in the first arrangement portion 32 of the casing 3. As illustrated in FIGS. 16 and 17, the operational-feeling switching mechanism 6 includes the click plate 61, the movement base 62, and a biasing member 63.

Configuration of Click Plate

The click plate 61 is provided in the +Z direction with respect to the cylindrical portion 45, and is moved by the movement base 62 in the −Z direction toward the cylindrical portion 45 of the rotator 42 or in the +Z direction away from the cylindrical portion 45. The click plate 61 corresponds to an engagement member, and is engageable with the cylindrical portion 45 when moved in the −Z direction. The click plate 61 includes a plate body 611, the to-be-guided portion 612, an engagement portion 613, and the protrusion 614.

The plate body 611 has a ring shape. The plate body 611 has an opening 6111 having a circular shape into which a portion in the +Z direction of the rotating body 44 is to be inserted. The plate body 611 has a surface in the +Z direction provided with two arrangement portions 6112 that are recessed in the −Z direction.

The two arrangement portions 6112 are provided at positions sandwiching a center portion of the click plate 61 as viewed from the +Z direction. The biasing member 63 is provided inside each of the arrangement portions 6112.

The to-be-guided portion 612 is a part that protrudes radially outward from an outer periphery of the plate body 611. The plate body 611 is provided with three to-be-guided portions 612. The to-be-guided portions 612 are each disposed in the corresponding one of the guides 321 to 323 provided in the casing 3 to restrict rotation of the click plate 61 about the rotation axis Rx and to guide the movement in the ±Z directions.

As with the to-be-guided portion 612, the engagement portion 613 is a part that protrudes radially outward from the outer periphery of the plate body 611. The plate body 611 is provided with three engagement portions 613. Each of the engagement portions 613 engages with an inclined portion 624 of the movement base 62.

As illustrated in FIG. 17, the protrusion 614 is provided in each of two to-be-guided portions 612 that are provided at both ends in the +X direction of the plate body 611, out of the three to-be-guided portions 612. Each of the protrusions 614 protrudes in a substantially truncated quadrangular pyramid shape in the −Z direction from a surface in the −Z direction of the to-be-guided portion 612. That is, the protrusion 614 has an inclined surface facing the +Y direction and an inclined surface facing the −Y direction. In other words, the protrusion 614 has an inclined surface facing the +D direction and an inclined surface facing the −D direction.

The protrusion 614 fits into the fitting portion 451 when the rotator 42 is rotated to generate the clicking feeling. A position of the fitting portion 451 in the rotator 42 and a position of the protrusion 614 in the click plate 61 are defined such that the clicking feeling occurs when, for example, the rotator 42 is disposed at a first reference position.

The click plate 61 is movable in the ±Z directions. The protrusion 614 is thus separated from the fitting portion 451 when the rotator 42 is further rotated in the state where the protrusion 614 is fitted into the fitting portion 451.

Configuration of Movement Base

The movement base 62 is provided to be rotatable about the rotation axis Rx of the rotator 42. The movement base 62 engages with the slide member 72 of the state switching mechanism 7 to be described later, and moves the click plate 61 in the ±Z directions in association with movement in the ±Y directions of the slide member 72. That is, the movement base 62 is a movement member that moves the click plate 61 closer to or away from the fitting portion 451 of the rotator 42 in association with the sliding of the slide member 72. As illustrated in FIGS. 16 and 17, the movement base 62 includes a base body 621, two extending portions 622, a connecting portion 623, and the inclined portion 624.

The base body 621 has a ring shape. The base body 621 has an opening 6211 having a circular shape into which a portion in the +Z direction of the rotating body 44 is to be inserted.

The two extending portions 622 extend radially outward from a periphery of the base body 621 as viewed from the +Z direction and in opposite directions to each other. Specifically, one of the two extending portions 622 extends in the +Y direction and the other extends in the −Y direction.

The connecting portion 623 connects ends in the −X direction of the respective extending portions 622 to each other. The connecting portion 623 includes an engagement portion 6231 that is provided on an end in the −X direction to be engaged with the slide member 72. That is, the operational-feeling switching mechanism 6 includes the engagement portion 6231 that engages with the slide member 72. The engagement portion 6231 has a cylindrical shape protruding in the −Z direction from the connecting portion 623.

As illustrated in FIG. 16, the inclined portions 624 are provided in ends in the +X direction and ends in the −X direction of the respective extending portions 622. That is, the movement base 62 includes four inclined portions 624. Each of the inclined portions 624 is inclined to the circumferential direction about the rotation axis of the movement base 62. More specifically, the inclined portion 624 is inclined to face the +Z direction and the counterclockwise direction about the rotation axis Rx as viewed from the +Z direction. The inclined portion 624 pushes up in the +Z direction the engagement portion 613 and the to-be-guided portion 612 in the −X direction in association with the counterclockwise rotation as viewed from the +Z direction of the movement base 62, and thus separates the click plate 61 from the cylindrical portion 45. In this configuration, even when the rotator 42 is rotated, the protrusion 614 is not fitted to the fitting portion 451, and no clicking feeling occurs.

Configuration of Biasing Member

The biasing member 63 biases the click plate 61 in the −Z direction. As illustrated in FIG. 16, the biasing member 63 is provided in the corresponding arrangement portion 6112 and is disposed between the cover 38 and the click plate 61. That is, the operational-feeling switching mechanism 6 includes two biasing members 63. An end in the +Z direction of each of the biasing members 63 is in contact with a surface in the −Z direction of the cover 38 and an end in the −Z direction of each of the biasing members 63 is in contact with the click plate 61.

Action of Operational-Feeling Switching Mechanism

When the click plate 61 is not moved in the +Z direction by the movement base 62, the click plate 61 is biased by the biasing member 63 in the direction toward the cylindrical portion 45 of the rotating body 44, and is disposed at a position where the protrusion 614 is fittable in the fitting portion 451 in the +Z direction. That is, the click plate 61 is disposed at a position at which the clicking feeling can occur.

In contrast, when the movement base 62 is rotated counterclockwise as viewed from the +Z direction and the click plate 61 is moved in the +Z direction against the biasing force of the biasing member 63, the protrusion 614 is separated in the +Z direction from the fitting portion 451. This causes the protrusion 614 to be disposed at a position at which the protrusion 614 cannot fit in the fitting portion 451 in the +Z direction. That is, the click plate 61 is disposed at a position at which the clicking feeling cannot occur.

Such rotation of the movement base 62 is performed by the sliding of the slide member 72 with which the movement base 62 engages.

Configuration of State Switching Mechanism

Figure 18:
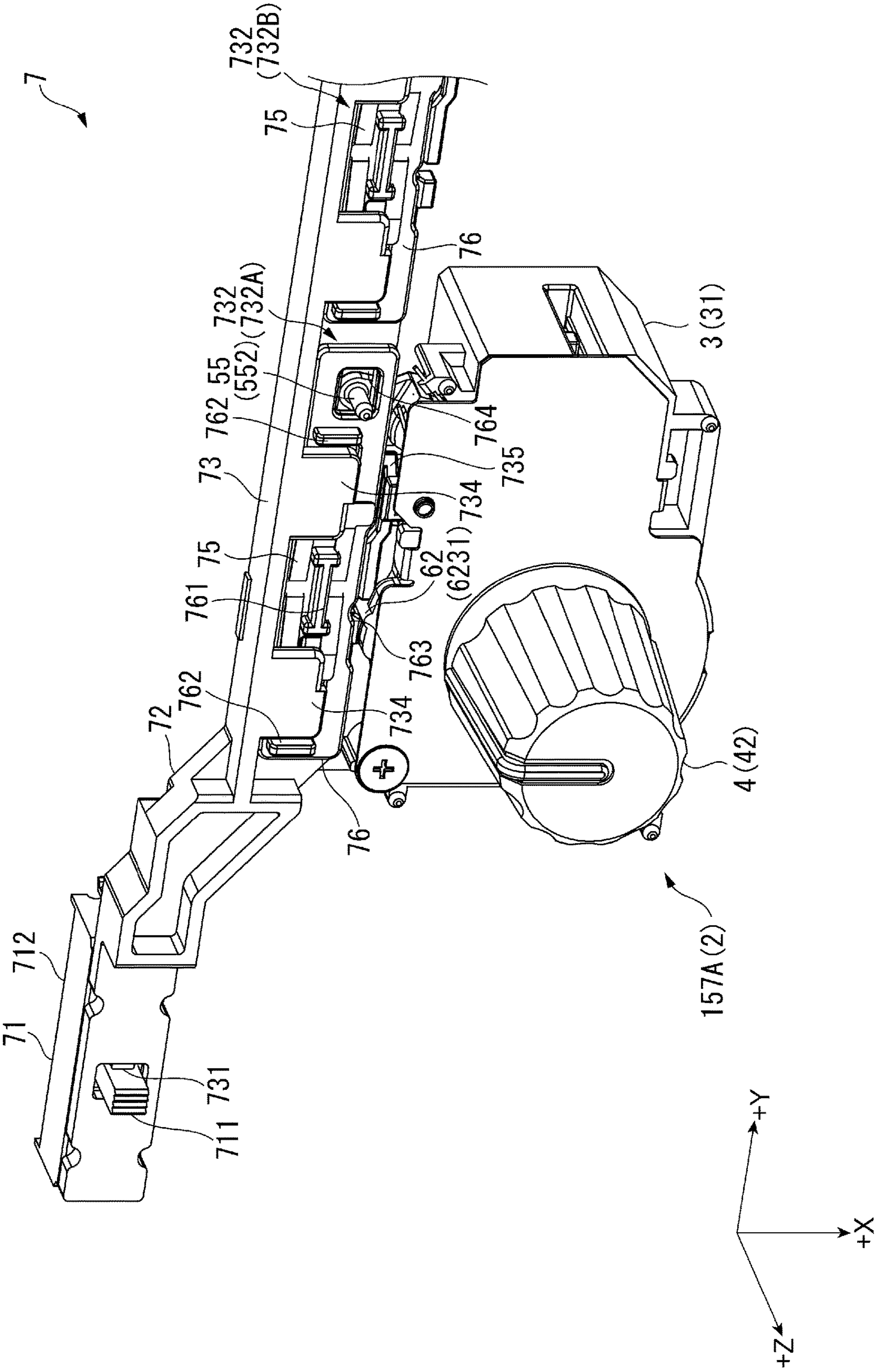
FIG. 18 is a perspective view of a portion of the state switching mechanism and one rotary operator according to the first exemplary embodiment.
Figure 19:
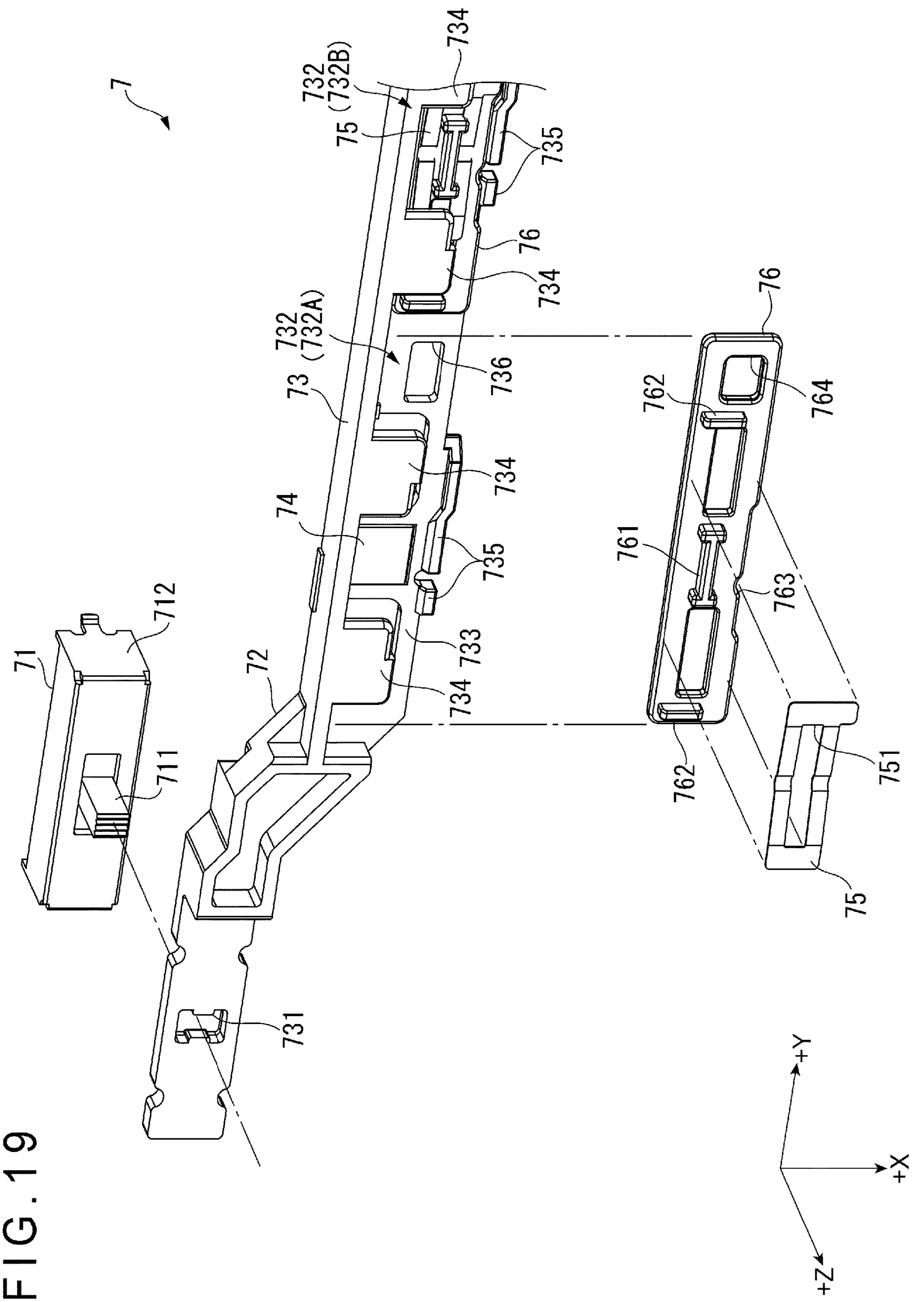
FIG. 19 is an exploded perspective view of a portion of the state switching mechanism according to the first exemplary embodiment.

FIG. 18 is a perspective view of a portion of the state switching mechanism 7 and one rotary operator 2. More specifically, FIG. 18 is the perspective view illustrating a portion of the state switching mechanism 7 and the rotary operator 2 that configures the effect adjuster 157A. FIG. 19 is an exploded perspective view of a portion of the state switching mechanism 7.

The state switching mechanism 7 switches the operation modes and the operational feelings of the rotary operator 2 as described above. As illustrated in FIGS. 2, 18, and 19, the state switching mechanism 7 includes a slide switch 71 and the slide member 72.

Configuration of Slide Switch

As illustrated in FIGS. 18 and 19, the slide switch 71 includes the slide operator 711, and a holder 712 that holds the slide operator 711. The slide switch 71 switches the operation modes of the rotary operator 2 in accordance with the position of the slide operator 711.

The slide operator 711 is exposed on the microphone adjuster 12 (see, FIG. 1) on the top surface 11A of the casing 11. The slide operator 711 is provided to be slidable in the +Y direction in the holder 712. The slide operator 711 is allocatable at three positions along the +Y direction. That is, the slide operator 711 is allocatable at one switching position out of a first switching position, a second switching position that is a position in the +Y direction with respect to the first switching position, and a third switching position that is a position in the +Y direction with respect to the second switching position.

The holder 712 is fixed in the casing 11. The holder 712 outputs an operation signal corresponding to the position of the slide operator 711 to the controller (not illustrated) that controls the acoustic device 1, and switches the operation modes of the rotary operator 2.

Setting of the operation modes in accordance with the disposition position of the slide operator 711 will be described in detail later.

Configuration of Slide Member

The slide member 72 is provided in the casing 11 to be slidable in response to a slide operation on the slide operator 711. That is, the slide member 72 slides with the slide operator 711 in the same direction as a direction in which the slide operator 711 slides. The slide member 72 includes a first slide member 73, an elastic member 74, a biasing member 75, and a second slide member 76.

The first slide member 73 engages with the slide operator 711 and slides in the ±Y directions with the slide operator 711. The first slide member 73 has one opening 731 as illustrated in FIGS. 2, 18, and 19, and includes a holding portion 732 as illustrated in FIG. 2.

The slide operator 711 is inserted from the −Z direction into the opening 731. An inner diameter of the opening 731 is the substantially same as an outer diameter of the slide operator 711. The slide operator 711 is thus exposed from the opening 731 in the +Z direction. Sliding in the ±Y directions the slide operator 711 exposed on the top surface 11A of the casing 11 causes the first slide member 73 to slide in the same direction as the slide direction of the slide operator 711.

The holding portion 732 holds the elastic member 74, the biasing member 75, and the second slide member 76. The number of each of the holding portions 732, the elastic members 74, the biasing members 75, and the second slide members 76 is determined in accordance with the number of the rotary operators 2. As illustrated in FIG. 2, the holding portion 732 includes a holding portion 732A corresponding to the rotary operator 2 that configures the effect adjuster 157A, a holding portion 732B corresponding to the rotary operator 2 that configures the effect adjuster 157B, a holding portion 732C corresponding to the rotary operator 2 that configures the effect adjuster 157C, and a holding portion 732D corresponding to the rotary operator 2 that configures the effect adjuster 157D.

As illustrated in FIGS. 18 and 19, the holding portion 732A includes an arrangement portion 733, two clamp pieces 734, two engagement pieces 735, and an opening 736.

The arrangement portion 733 is a wall along an XY plane. On the arrangement portion 733, the elastic member 74 is fixed, and in addition, the biasing member 75 and the second slide member 76 are disposed.

The two clamp pieces 734 are provided at respective positions opposed to the arrangement portion 733 in the +Z direction. The two clamp pieces 734 clamp, between themselves and the arrangement portion 733, the biasing member 75 and the second slide member 76 disposed on the arrangement portion 733.

The two engagement pieces 735 protrude in the +Z direction from an end in the +X direction of the arrangement portion 733. The two engagement pieces 735 restrict the biasing member 75 and the second slide member 76 disposed on the arrangement portion 733 from sliding in the +X direction. The engagement portion 6231 of the movement base 62 is disposed between the two engagement pieces 735. Thus, when the slide member 72 is slid in the −Y direction, the slide member 72 causes the movement base 62 to rotate counterclockwise as viewed from the +Z direction, and when the slide member 72 is slid in the +Y direction, the slide member 72 causes the movement base 62 to rotate clockwise as viewed from the +Z direction.

The opening 736 is an opening having a rectangular shape that is long in the +Y direction. The engagement portion 552 of the switching member 55 is inserted into the opening 736.

The holding portions 732B, 732C, and 732D each have the same configuration as that of the holding portion 732A, and thus the descriptions thereof are omitted.

Configurations of Elastic Member and Biasing Member

As illustrated in FIG. 19, the elastic member 74 is a member that is provided on a surface in the +Z direction of the arrangement portion 733 and fills a gap between the arrangement portion 733 and the second slide member 76 provided on the arrangement portion 733. The elastic member 74 inhibits unintentional sliding of the second slide member 76 along the XY plane.

The biasing member 75 is a member that biases the second slide member 76 toward the first slide member 73. In the exemplary embodiment, a leaf spring is employed as the biasing member 75. The biasing member 75 is disposed between the clamp piece 734 and the arrangement portion 733 to bias the second slide member 76 toward the arrangement portion 733. An opening 751 along the +Y direction is provided in the middle of the biasing member 75 as viewed from the +Z direction, and an insertion portion 761 of the second slide member 76 is inserted into the opening 751.

Configuration of Second Slide Member

The second slide member 76 is provided on the arrangement portion 733 of the first slide member 73 to be slidable in the ±Y directions that are the slide directions of the first slide member 73. The second slide member 76 causes the switching member 55 of the corresponding rotary operator 2 to rotate. The second slide member 76 is provided to absorb tolerances of components including, without limitation, the restriction switching mechanism 5 and the first slide member 73. The second slide member 76 includes the insertion portion 761, a restricting piece 762, a recess 763, and a through opening 764.

The insertion portion 761 protrudes in the +Z direction from approximately the middle of the second slide member 76 as viewed from the +Z direction. The insertion portion 761 is inserted into the opening 751 of the biasing member 75.

Two restricting pieces 762 are provided on a surface in the +Z direction of the second slide member 76, and the two restricting pieces 762 are separated from each other in the +Y direction. The biasing member 75 is disposed between the two restricting pieces 762, and in addition, the two clamp pieces 734 are sandwiched between the two restricting pieces 762 in the +Y direction. As a result, a slidable range in the +Y direction of the second slide member 76 is defined.

The recess 763 is provided on an end surface in the +X direction of the second slide member 76. The recess 763, which is recessed in the −X direction, is a part for avoiding the engagement portion 6231 of the movement base 62 that engages with the two engagement pieces 735.

The through opening 764 is an opening provided in a part in the +Y direction of the second slide member 76. The through opening 764 passes through the second slide member 76 along the +Z direction. The engagement portion 552 of the switching member 55 is inserted into the through opening 764. When the slide member 72 slides in the −Y direction, an inner surface in the −Y direction out of inner surfaces of the through opening 764 presses the engagement portion 552 in the +Y direction to cause the switching member 55 to rotate clockwise as viewed from the +Z direction.

Action of State Switching Mechanism

As described above, the slide operator 711 is slid in the ±Y directions and is thereby disposed at one of the first switching position, the second switching position, or the third switching position. Further, the slide member 72 is engaged with the slide operator 711, and thus slides in the ±Y directions together with the slide operator 711.

Figure 20:
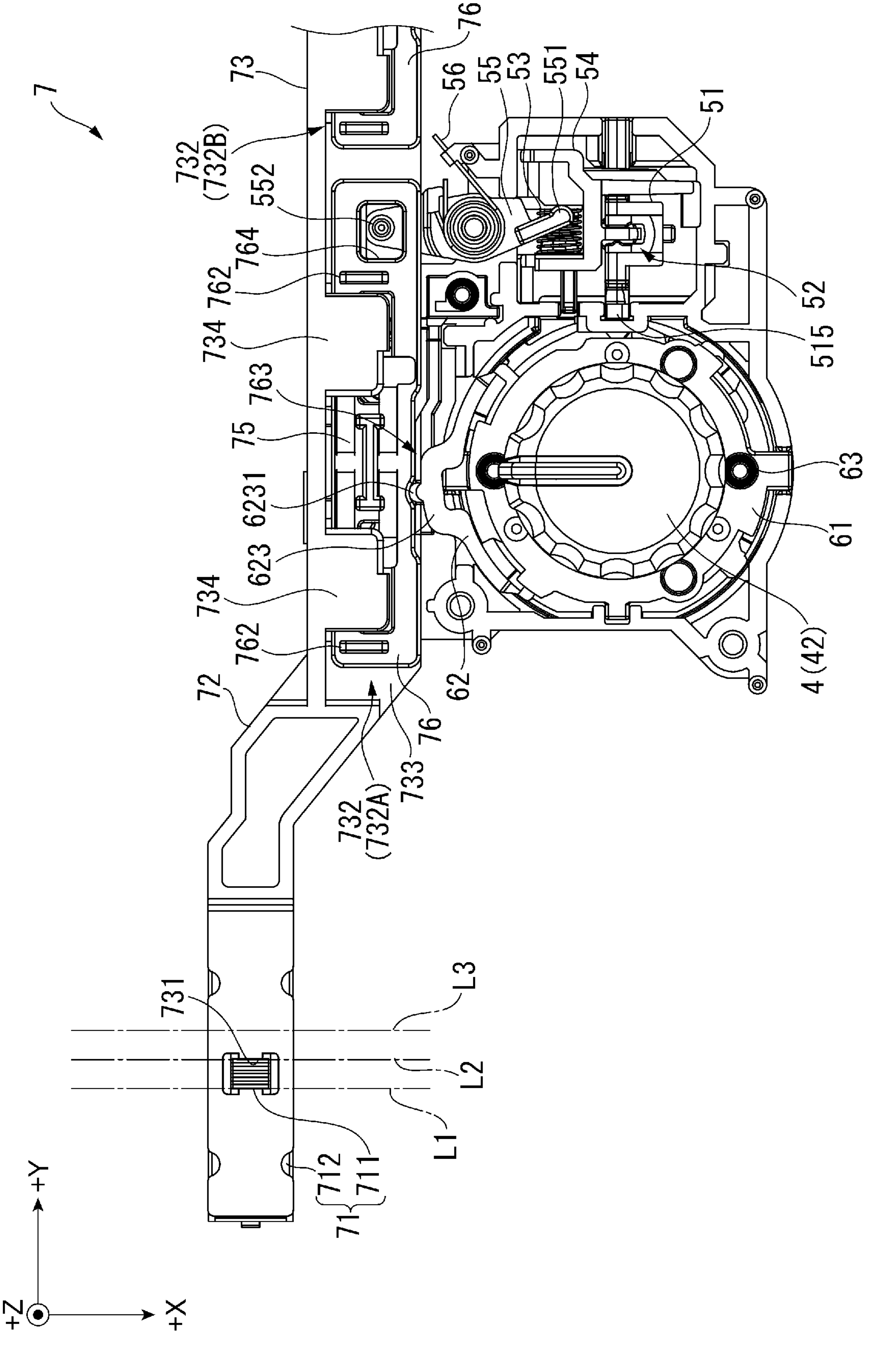
FIG. 20 is a plan view of the state switching mechanism according to the first exemplary embodiment, the state switching mechanism being in a state where a slide operator is disposed at a first switching position.

FIG. 20 is a plan view of the state switching mechanism 7 in a state where the slide operator 711 is disposed at the first switching position. In FIG. 20, a chain line L1 indicates a position of an end in the −Y direction of the slide operator 711 disposed at the first switching position. A chain line L2 indicates a position of the end in the −Y direction of the slide operator 711 disposed at the second switching position. A chain line L3 indicates a position of the end in the −Y direction of the slide operator 711 disposed at the third switching position.

As illustrated in FIG. 20, when an operation of disposing the slide operator 711 at the first switching position is performed, the holder 712 outputs, to the controller, an operation signal for switching the operation mode of the rotary operator 2, and thus the operation mode of the acoustic device 1, to a first mode. The controller to which the signal for switching the operation mode to the first mode is inputted switches the operation mode of the rotary operator 2 to the first mode.

When the slide operator 711 is disposed at the first switching position, the slide member 72 is disposed farthest in the −Y direction in a movable range of the slide member 72.

In this case, the movement base 62 engaged with the slide member 72 causes the click plate 61 of the operational-feeling switching mechanism 6 to be disposed at a position at which the protrusion 614 does not fit into the fitting portion 451 even when the rotator 42 is rotated. In other words, the movement base 62 disposes the click plate 61 at a position at which no clicking feeling occurs even when the rotator 42 is rotated.

Further, the holding member 54 and the contact piece 51 are biased by the third biasing member 56, and are disposed at respective positions that are separated in the +Y direction from the rotator 42 by the switching member 55 engaged with the slide member 72. In this state, the contact portion 515 is separated from the rotator 42, and thus the rotation of the rotator 42 that passes the reference position is not restricted by the contact piece 51.

In the exemplary embodiment, the first mode is an operation mode for setting an effect amount of one effect by the whole rotatable range of the rotator 42 including the reference position. That is, the first mode is a mode in which the effect amount of one effect is set based on the rotation angle of the rotator 42 with the rotation limit in the −D direction of the rotator 42 being set as a minimum value, the rotation limit in the +D direction of the rotator 42 being set as a maximum value. In the first mode, no clicking feeling occurs during the rotation operation of the rotator 42.

Figure 21:
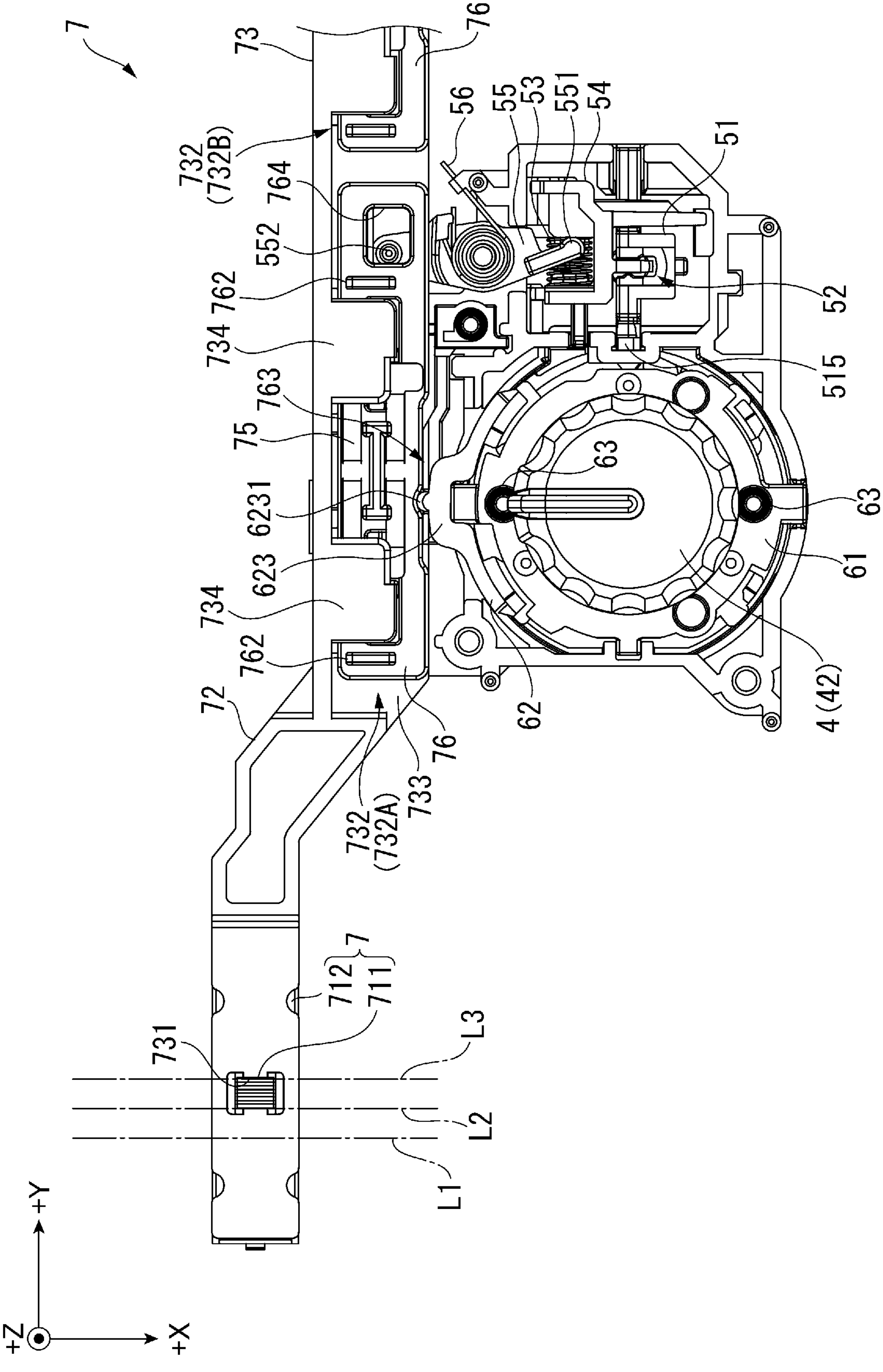
FIG. 21 is a plan view of the state switching mechanism according to the first exemplary embodiment, the state switching mechanism being in a state where the slide operator is disposed at a second switching position.

FIG. 21 is a plan view of the state switching mechanism 7 in a state where the slide operator 711 is disposed at the second switching position. The chain lines L1 to L3 in FIG. 21 are the same as the chain lines L1 to L3 illustrated in FIG. 20.

As illustrated in FIG. 21, when an operation of disposing the slide operator 711 at the second switching position is performed, the holder 712 outputs, to the controller, an operation signal for switching the operation mode of the rotary operator 2, and thus the operation mode of the acoustic device 1, to a second mode. The controller to which the signal for switching the operation mode to the second mode is inputted switches the operation mode of the rotary operator 2 to the second mode.

When the slide operator 711 is disposed at the second switching position, the slide member 72 is disposed substantially in the middle in the movable range of the slide member 72.

In this case, the click plate 61 of the operational-feeling switching mechanism 6 is disposed at a position at which the protrusion 614 is fittable in the fitting portion 451 by the movement base 62. That is, the click plate 61 is disposed by the movement base 62 at a position at which the clicking feeling occurs when the rotator 42 is rotated.

In contrast, as with the case where the slide operator 711 is disposed at the first switching position, the holding member 54 and the contact piece 51 are disposed at respective positions that are separated in the +Y direction from the rotator 42 by the switching member 55. Accordingly, the contact portion 515 is separated from the rotator 42, and thus the rotation of the rotator 42 that passes the reference position is not restricted by the contact piece 51.

In the exemplary embodiment, the second mode is an operation mode in which: when the rotator 42 is rotated in the +D direction from the reference position, an effect amount of a first effect is set in accordance with the rotation angle of the rotator 42 from the reference position toward the +D direction; and when the rotator 42 is rotated in the −D direction from the reference position, an effect amount of a second effect is set in accordance with the rotation angle of the rotator 42 from the reference position toward the −D direction. In the second mode, the clicking feeling occurs during the rotation operation of the rotator 42.

Figure 22:
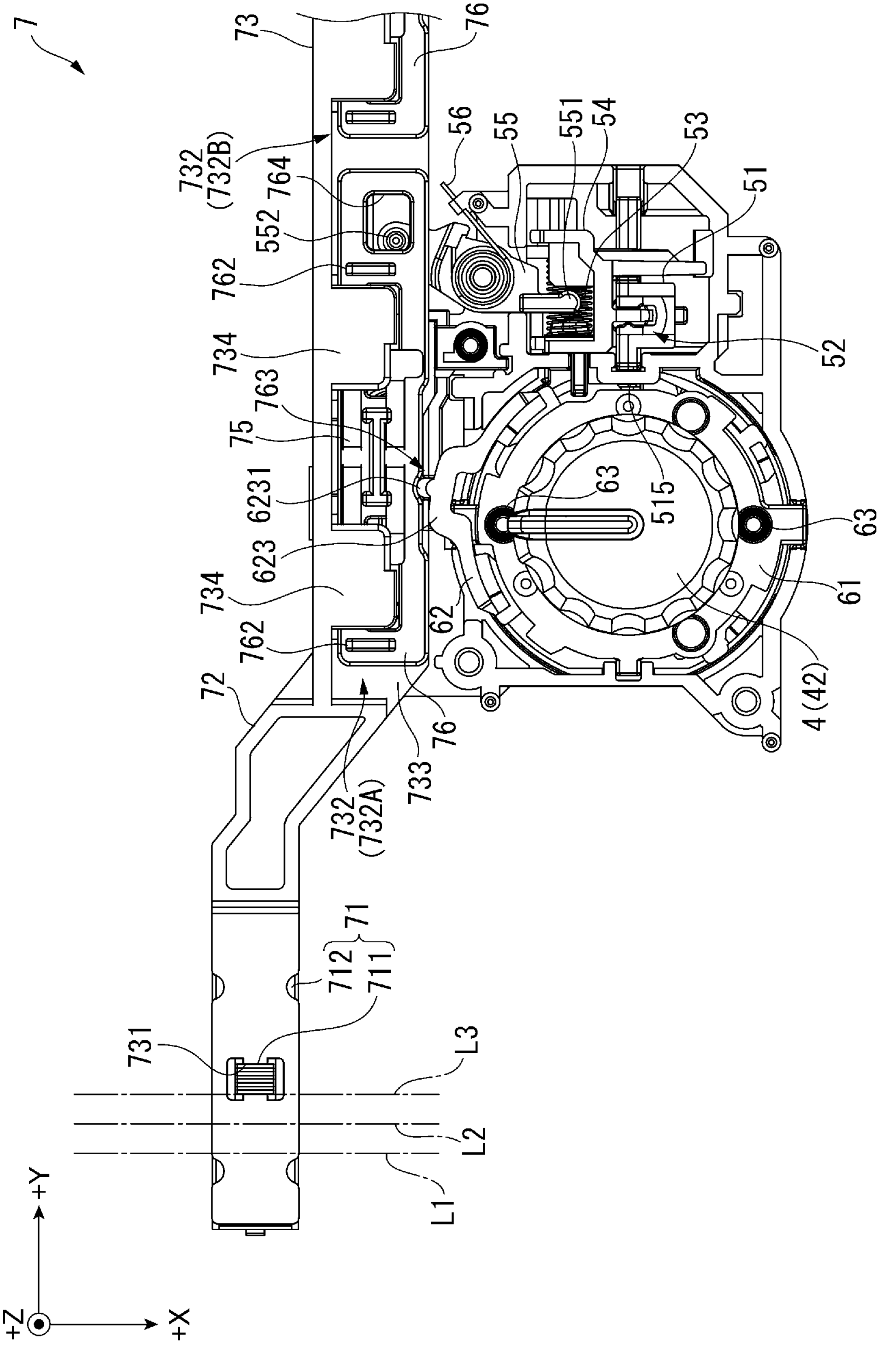
FIG. 22 is a plan view of the state switching mechanism according to the first exemplary embodiment, the state switching mechanism being in a state where the slide operator is disposed at a third switching position.

FIG. 22 is a plan view of the state switching mechanism 7 in a state where the slide operator 711 is disposed at the third switching position. The chain lines L1 to L3 in FIG. 22 are the same as the chain lines L1 to L3 illustrated in FIG. 20.

As illustrated in FIG. 22, when an operation of disposing the slide operator 711 at the third switching position is performed, the holder 712 outputs, to the controller, an operation signal for switching the operation mode of the rotary operator 2, and thus the operation mode of the acoustic device 1, to a third mode.

When the slide operator 711 is disposed at the third switching position, the slide member 72 is disposed farthest in the +Y direction in the movable range of the slide member 72.

In this case, as with the case where the slide operator 711 is disposed at the second switching position, the click plate 61 of the operational-feeling switching mechanism 6 is disposed at a position at which the protrusion 614 is fittable in the fitting portion 451 by the movement base 62. That is, the click plate 61 is disposed by the movement base 62 at a position at which the clicking feeling occurs when the rotator 42 is rotated.

Further, when the slide member 72 is disposed at the third switching position, the biasing in the +Y direction on the holding member 54 by the switching member 55, which is rotated clockwise as viewed from the +Z direction by the slide member 72, is released. Accordingly, the holding member 54 is biased in the −Y direction by the second biasing member 53, and the contact piece 51 is thus biased toward the rotation axis Rx. This causes the contact portion 515 to come into contact with the rotator 42. The contact portion 515 moves along the movement paths RT1 and RT2 in association with the rotation of the rotator 42, and the rotation of the rotator 42 that passes the reference position is restricted.

As described above, in the third mode, the clicking feeling occurs during the rotation operation of the rotator 42. In contrast, unlike the case in the second mode, the rotation of the rotator 42 that passes the reference position is restricted in the third mode.

In the exemplary embodiment, as with the second mode, the third mode is an operation mode in which the effect amount of the first effect is set in accordance with the rotation angle of the rotator 42 from the reference position toward the +D direction, and the effect amount of the second effect is set in accordance with the rotation angle of the rotator 42 from the reference position toward the −D direction. Accordingly, upon adjustment on the effect amount of one of the first effect and the second effect, the effect amount of the other effect is prevented from being erroneously adjusted.

As described above, by slidingly moving in the ±Y directions the slide operator 711 that is an operation knob exposed on the top surface 11A of the casing 11, it is possible to not only switch the operation modes of each of the rotary operators 2 that configure the effect adjusters 157A to 157D, but also to simultaneously switch the operational feelings of each of the rotary operators 2 and the restricted states of each of the rotary operators 2.

Effects of First Exemplary Embodiment

The acoustic device 1 according to the exemplary embodiment described above can achieve the following effects.

The acoustic device 1 includes the rotary operator 2.

The rotary operator 2 includes the rotator 42 and the contact piece 51. The movement paths RT1 and RT2 inclined to the circumferential direction about the rotation axis Rx are provided for the outer circumferential surface 45A. The rotator 42 is rotated about the rotation axis Rx. The contact piece 51 comes into contact with the rotator 42, and moves along the movement paths RT1 and RT2 in the direction along the rotation axis Rx in association with the rotation of the rotator 42.

In the counterclockwise-side range, the rotation of the rotator 42 in the +D direction (a first rotation direction) about the rotation axis Rx is restricted by the contact piece 51 being located at the first position in the counterclockwise-side range when the rotator 42 is rotated in the +D direction and reaches the reference position. The +D direction is the clockwise direction as viewed from the +Z direction.

When the rotating force in the +D direction applied to the rotator 42 is reduced in the state where the rotation of the rotator 42 in the +D direction from the reference position is restricted, the contact piece 51 returns to the second position from the first position, thereby allowing the rotation of the rotator 42 in the +D direction from the reference position.

Further, in the clockwise-side range, the rotation of the rotator 42 in the −D direction (the first rotation direction) about the rotation axis Rx is restricted by the contact piece 51 being located at the first position in the clockwise-side range when the rotator 42 is rotated in the −D direction and reaches the reference position. The −D direction is the counterclockwise direction as viewed from the +Z direction.

When the rotating force in the −D direction applied to the rotator 42 is reduced in the state where the rotation of the rotator 42 in the −D direction from the reference position is restricted, the contact piece 51 returns to the second position from the first position, thereby allowing the rotation of the rotator 42 in the −D direction from reference position.

With such a configuration, it is possible to restrict the rotator 42 rotated in the +D direction from being erroneously rotated in the +D direction beyond the reference position. This makes it possible to easily rotate the rotator 42 in the ±D directions in the rotation range (the counterclockwise-side range) from the reference position to the rotation limit in the −D direction. When the rotator 42 rotated in the +D direction reaches the reference position, the rotating force in the +D direction applied to the rotator 42 is reduced, whereby the contact piece 51 returns to the second position from the first position and it is possible to rotate the rotator 42 in the +D direction from the reference position. This makes it possible not only to restrict the rotation of the rotator 42 in the +D direction from the reference position, but also to allow the rotation of the rotator 42 in the +D direction from the reference position.

Similarly, it is possible to restrict the rotator 42 rotated in the −D direction from being erroneously rotated in the −D direction beyond the reference position. This makes it possible to easily rotate the rotator 42 in the ±D directions in the rotation range (the clockwise-side range) from the reference position to the rotation limit in the +D direction. When the rotator 42 rotated in the −D direction reaches the reference position, the rotating force in the −D direction applied to the rotator 42 is reduced, whereby the contact piece 51 returns to the second position from the first position and it is possible to rotate the rotator 42 in the −D direction from the reference position. This makes it possible not only to restrict the rotation of the rotator 42 in the −D direction from the reference position, but also to allow the rotation of the rotator 42 in the −D direction from the reference position.

Operability of the rotary operator 2 is thus improved.

The rotary operator 2 includes the first biasing member 52 that biases the contact piece 51 in a direction from the first position toward the second position.

With such a configuration, it is possible to easily cause the contact piece 51 to return to the second position from the first position in the counterclockwise-side range, when the rotating force in the +D direction applied to the rotator 42 is reduced in the state where the rotation of the rotator 42 in the +D direction (the first rotation direction) from the reference position is restricted in the counterclockwise-side range. Similarly, it is possible to easily cause the contact piece 51 to return to the second position from the first position in the clockwise-side range, when the rotating force in the −D direction applied to the rotator 42 is reduced in the state where the rotation of the rotator 42 in the −D direction (the first rotation direction) from the reference position is restricted in the clockwise-side range. It is therefore possible to easily perform the rotation of the rotator 42 in the ±D directions from the reference position, and to improve operability of the rotary operator 2.

In the rotary operator 2, the rotator 42 includes the restricting portions 471 and 481.

The restricting portion 471 comes into contact with the contact portion 515 of the contact piece 51 when the rotator 42 is rotated in the −D direction (the first rotation direction) and reaches the reference position in the clockwise-side range, and restricts the relative movement in the +D direction (the direction opposite to the first rotation direction) of the contact piece 51 with respect to the rotator 42. That is, the restricting portion 471 restricts the rotator 42 from rotating in the −D direction from the reference position in the clockwise-side range.

The restricting portion 481 comes into contact with the contact portion 515 of the contact piece 51 when the rotator 42 is rotated in the +D direction (the first rotation direction) and reaches the reference position in the counterclockwise-side range, and restricts the relative movement in the −D direction (the direction opposite to the first rotation direction) of the contact piece 51 with respect to the rotator 42. That is, the restricting portion 481 restricts the rotator 42 from rotating in the +D direction from the reference position in the counterclockwise-side range.

With such a configuration, it is possible to restrict the rotator 42 from rotating in the −D direction from the reference position in the clockwise-side range by the contact piece 51 coming into contact with the restricting portion 471. Further, it is possible to restrict the rotator 42 from rotating in the +D direction from the reference position in the counterclockwise-side range by the contact piece 51 coming into contact with the restricting portion 481.

Operability of the rotary operator 2 is thus improved.

In the rotary operator 2, the movement path RT1 includes the first path RT11 and the second path RT12. The first path RT11 is a path along which the contact piece 51 moves relatively in the +D direction (the direction opposite to the first rotation direction) with respect to the rotator 42 from the second position, when the rotator 42 is rotated in the −D direction (the first rotation direction) from the reference position. The second path RT12 is a path by which the contact piece 51 is led to the restricting portion 481 when the rotator 42, which has been rotated in the −D direction from the reference position in the counterclockwise-side range, is rotated in the +D direction. That is, the second path RT12 is a path by which the contact piece 51 is led to the first position in the counterclockwise-side range when the rotator 42, which has been rotated in the −D direction from the reference position in the counterclockwise-side range, is rotated in the +D direction.

With such a configuration, when the rotator 42 rotated in the +D direction reaches the reference position in the state where the contact piece 51 reaches the second path RT12, it is possible to lead the contact piece 51 to the first position. Accordingly, it is possible to restrict the rotator 42 rotated in the +D direction from being rotated in the +D direction beyond the reference position.

This applies similarly to the movement path RT2 including the first path RT21 and the second path RT22, and thus it is possible to restrict the rotator 42 rotated in the −D direction from being rotated in the −D direction beyond the reference position.

In the rotary operator 2, a length of the first path RT11 in the −D direction (the first rotation direction) is shorter than a length of the second path RT12 in the −D direction. A length of the first path RT21 in the +D direction (the first rotation direction) is shorter than a length of the second path RT22 in the +D direction.

With such a configuration, it is possible to cause the contact portion 515 disposed at the second position to reach the second path RT12 with a small rotation amount of the rotator 42 from the reference position. The second path RT12 is a path from a movement limit in the +D direction of the contact portion 515 to the first position in the counterclockwise-side range when the rotator 42 is located in the counterclockwise-side range. In this configuration, when the rotator 42 is rotated in the +D direction and reaches the reference position in the counterclockwise-side range, it is possible to cause the contact portion 515 to reach the first position in the counterclockwise-side range. This makes it possible to restrict the rotation in the +D direction of the rotator 42 that passes the reference position.

Similarly, it is possible to cause the contact portion 515 disposed at the second position to reach the second path RT22 with a small rotation amount of the rotator 42 from the reference position, which makes it possible to restrict the rotation in the −D direction of the rotator 42 that passes the reference position.

The rotary operator 2 includes the second biasing member 53 that biases the contact piece 51 toward the rotation axis Rx. The second path RT12 is provided at a position closer to the rotation axis Rx than the first path RT11, and the second path RT22 is provided at a position closer to the rotation axis Rx than the first path RT21.

With such a configuration, it is possible to prevent the contact piece 51 that has moved from the first path RT11 to the second path RT12 from returning to the first path RT11. Further, it is possible to prevent the contact piece 51 that has moved from the first path RT21 to the second path RT22 from returning to the first path RT21. Accordingly, it is possible to restrict the rotation of the rotator 42 in the ±D directions that passes the reference position.

The reference position that is a predetermined position is a position where the length from the reference position to the rotation limit in the −D direction of the rotator 42 is equal to the length from the reference position to the rotation limit in the +D direction of the rotator 42.

With such a configuration, the reference position is a middle position in the entire rotatable range of the rotator 42. This makes it possible to allow the rotatable range in the +D direction from the reference position and the rotatable range in the −D direction from the reference position to be equal to each other. Usability of the rotary operator 2 is thus improved.

In the acoustic device 1, when the operation mode of the acoustic device 1 and the rotary operator 2 is the third mode in which the rotation of the rotator 42 that passes the reference position is restricted, the rotary operator 2 configures the effect adjuster 157 that adjusts the effect amount of the first effect in accordance with the rotation angle of the rotator 42 from the reference position toward the +D direction (the first rotation direction), and adjusts the effect amount of the second effect in accordance with the rotation angle of the rotator 42 from the reference position toward the −D direction.

With such a configuration, for example, the rotation of the rotator 42 in the +D direction that passes the reference position is restricted, preventing the effect amount of the first effect from being erroneously adjusted when the effect amount of the second effect is being adjusted. Further, for example, the rotation of the rotator 42 in the −D direction that passes the reference position is restricted, preventing the effect amount of the second effect from being erroneously adjusted when the effect amount of the first effect is being adjusted. Usability of the acoustic device 1 is thus improved.

Second Exemplary Embodiment

Next, a second exemplary embodiment of the disclosure will be described.

An acoustic device according to the exemplary embodiment has a configuration similar to that of the acoustic device 1 according to the first exemplary embodiment, but is different from the acoustic device 1 according to the first exemplary embodiment in that a path forming portion included in a rotator of a rotary operator is different in configuration as compared with the acoustic device 1 according to the first exemplary embodiment. In the following description, the same or substantially the same portions as those already described are denoted by the same reference numerals, and the description thereof is omitted.

Configuration of Rotary Operator

Figure 23:
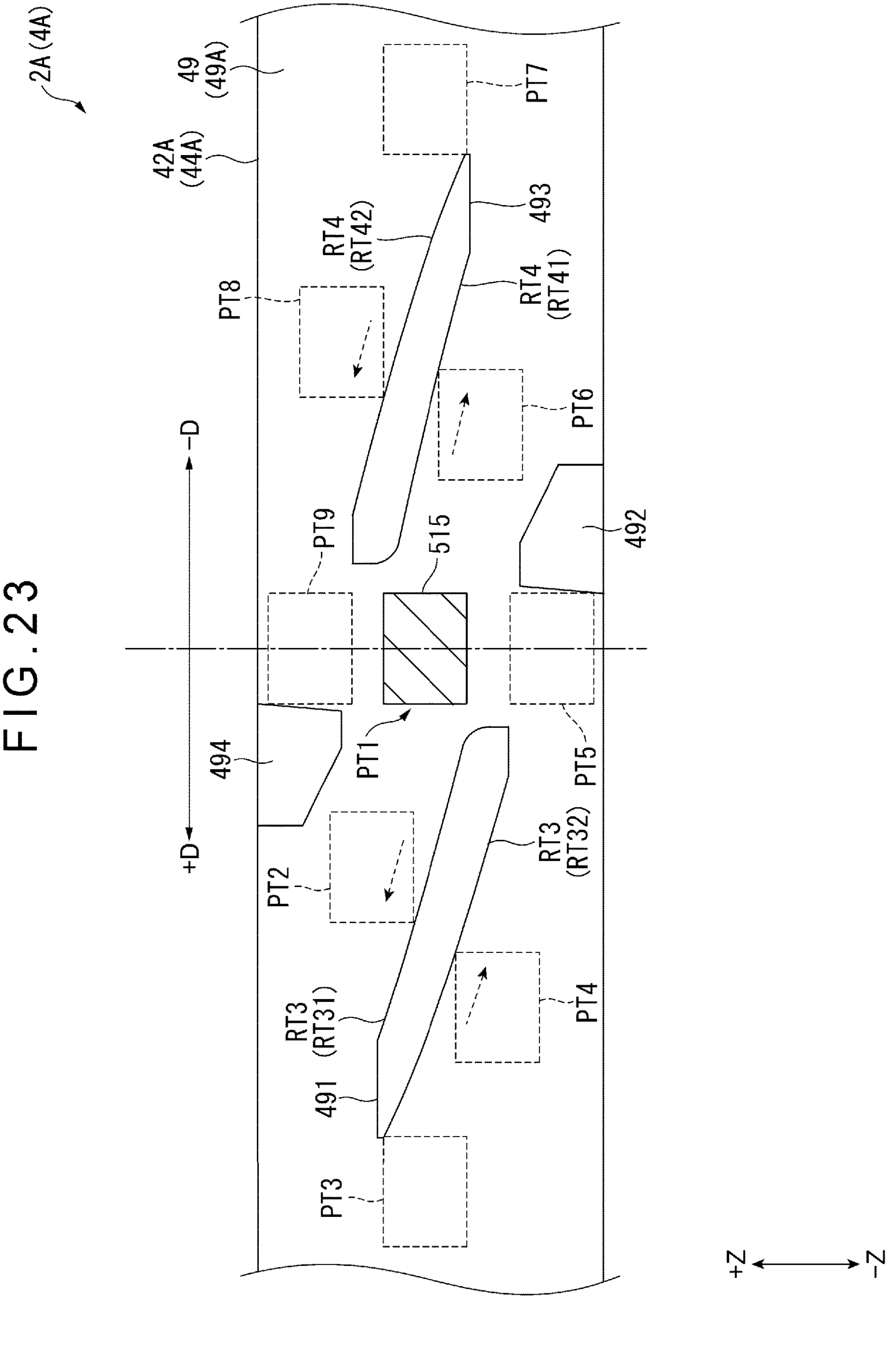
FIG. 23 schematically illustrates a cylindrical portion of an operator body of a rotary operator included in a mixer according to a second exemplary embodiment.

FIG. 23 schematically illustrates a cylindrical portion 49 included in an operator body 4A of a rotary operator 2A included in the acoustic device according to the exemplary embodiment. FIG. 23 illustrates the contact portion 515 of the contact piece 51 that moves relatively to the operator body 4A along the cylindrical portion 49, and in addition, positions PT1 to PT8 at which the contact portion 515 may be disposed.

The acoustic device according to the exemplary embodiment has a configuration and a function similar to those of the acoustic device 1 according to the first exemplary embodiment except that the acoustic device according to the exemplary embodiment includes the rotary operator 2A illustrated in FIG. 23 instead of the rotary operator 2.

As with the rotary operator 2, the rotary operator 2A is an operator to be rotated about the rotation axis Rx by a user. The rotary operator 2A configures, for example, each of the effect adjusters 157A to 157D. The rotary operator 2A has a configuration and a function similar to those of the rotary operator 2 except that the rotary operator 2A includes the operator body 4A instead of the operator body 4.

Configuration of Operator Body

As with the operator body 4 according to the first exemplary embodiment, the operator body 4A is a rotary volume that is to be rotated by the user and outputs a rotation angle with respect to a reference position. The operator body 4A includes the above-described base 41 and a rotator 42A.

The rotator 42A includes the above-described knob 43 and a rotating body 44A.

The rotating body 44A has a configuration similar to that of the rotating body 44 except that the rotating body 44A has the cylindrical portion 49 instead of the cylindrical portion 45.

The cylindrical portion 49 has a cylindrical shape about the rotation axis Rx of the rotator 42A in the rotating body 44A. The cylindrical portion 49 includes, on an outer circumferential surface 49A, path forming portions 491 and 493 and restricting portions 492 and 494. That is, the cylindrical portion 49 includes the path forming portions 491 and 493 and the restricting portions 492 and 494 each protruding radially outward about the rotation axis Rx from the outer circumferential surface 49A.

As with the path forming portions 47 and 48 described above, the path forming portions 491 and 493 respectively form movement paths RT3 and RT4 along which the contact portion 515 of the contact piece 51 moves relatively with respect to the rotator 42A when the rotator 42A is rotated about rotation axis Rx.

As with the path forming portion 47, the path forming portion 491 forms the movement path RT3 of the contact portion 515 when the rotator 42A is rotated in the counterclockwise-side range. The movement path RT3 is inclined to the circumferential direction about the rotation axis Rx. That is, the movement path RT3 inclined to the circumferential direction about the rotation axis Rx is provided for the outer circumferential surface 49A of the rotator 42A.

As with the restricting portion 481, when the rotator 42A disposed in the counterclockwise-side range is rotated in the +D direction, i.e., the clockwise direction, and reaches the reference position, the contact portion 515 moving in the −D direction comes into contact with the restricting portion 492, and the restricting portion 492 restricts the movement in the −D direction of the contact portion 515 and thus the rotation in the +D direction of the rotator 42A.

As with the path forming portion 48, the path forming portion 493 forms the movement path RT4 of the contact portion 515 when the rotator 42A disposed in the clockwise-side range is rotated. The movement path RT4 is inclined to the circumferential direction about the rotation axis Rx. That is, the movement path RT4 inclined to the circumferential direction about the rotation axis Rx is provided for the outer circumferential surface 49A of the rotator 42A.

As with the restricting portion 471, when the rotator 42A disposed in the clockwise-side range is rotated in the −D direction and reaches the reference position, the contact portion 515 moving in the +D direction comes into contact with the restricting portion 494, and the restricting portion 494 restricts the movement in the +D direction of the contact portion 515 and thus the rotation in the −D direction of the rotator 42A.

As with the path forming portion 48, the path forming portion 493 forms the movement path RT4 of the contact portion 515 when the rotator 42A is rotated in the clockwise-side range. The path forming portion 491 and the path forming portion 493 are provided on the outer circumferential surface 49A to be point-symmetric about the position PT1. Similarly, the restricting portion 492 and the restricting portion 494 are provided on the outer circumferential surface 49A to be point-symmetric about the position PT1.

Movement Path of Contact Portion

The path forming portion 491 is inclined to the +D direction and the +Z direction to be located in the +Z direction toward the +D direction. A surface in the +Z direction of the path forming portion 491 forms a first path RT31, of the movement path RT3, along which the contact portion 515 disposed at the position PT1 in the counterclockwise-side range moves in the +D direction to reach a second path RT32. A surface in the −Z direction of the path forming portion 491 forms a portion of the second path RT32, of the movement path RT3, along which the contact portion 515 having reached the movement limit in the +D direction in the counterclockwise-side range moves to reach the restricting portion 492. A length in the +D direction of the first path RT31 is approximately the same as a length in the +D direction of the second path RT32. A surface in the +Z direction forming the first path RT31 in the path forming portion 491 and a surface in the −Z direction forming the portion of the second path RT32 in the path forming portion 491 are each inclined to the circumferential direction about the rotation axis Rx.

When the rotator 42A located at the reference position is rotated in the −D direction, the contact portion 515 moves along the first path RT31 and reaches, for example, the position PT2. In a state where the contact portion 515 is located on the first path RT31, when the rotator 42A is rotated in the +D direction, the contact portion 515 moves relatively in the −D direction along the first path RT31. In this case, the contact portion 515 does not come into contact with the restricting portion 492, and thus the rotation of the rotator 42A that passes the reference position is not restricted.

When the rotator 42A is further rotated in the −D direction and the contact portion 515 reaches a movement limit in the +D direction in the counterclockwise-side range, the contact portion 515 and the path forming portion 491 are separated from each other, and the contact portion 515 reaches the second path RT32 that connects the movement limit in the +D direction and the position PT5 (the first position in the counterclockwise-side range). At this time, a position in the +Z direction of the contact portion 515 matches a position in the +Z direction of the contact portion 515 when the contact piece 51 is disposed at the position PT1 owing to the biasing force of the first biasing member 52. Accordingly, when the rotator 42A is rotated to the rotation limit in the −D direction in the state where the contact portion 515 is separated from the path forming portion 491, the contact portion 515 is moved to the movement limit in the +D direction along the second path RT32 with the position in the +Z direction unchanged.

Here, an end in the +D direction of the path forming portion 491 is located in the +Z direction relative to an end in the +Z direction of the contact portion 515 when the contact piece 51 is disposed at the position PT1. Thus, when the rotator 42A is rotated in the +D direction from the rotation limit in the −D direction, the contact portion 515 comes into contact with a surface in the −Z direction of the path forming portion 491 as indicated by the position PT3. When the rotator 42A is further rotated in the +D direction, the contact portion 515 reaches the position PT4.

In a state where the contact portion 515 is disposed on the second path RT32, when the rotator 42A is rotated in the +D direction and reaches the reference position, the contact portion 515 reaches the position PT5 that is in contact with the restricting portion 492 provided on an extension of the second path RT32. A position of the contact piece 51 when the contact portion 515 is disposed at the position PT5 corresponds to the first position in the counterclockwise-side range. Movement in the −D direction of the contact portion 515 having reached the position PT5 is restricted by the restricting portion 492, and thus the rotation in the +D direction of the rotator 42A is restricted. That is, the rotation of the rotator 42A in the +D direction from the reference position is restricted by the contact piece 51 being at the first position in the counterclockwise-side range.

When rotating force in the +D direction applied to the rotator 42A is reduced by, for example, the user releasing his or her finger from the knob 43, in the state where the contact piece 51 is located at the first position, the contact portion 515 returns to the position PT1 owing to the biasing force in the +Z direction of the first biasing member 52. The position of the contact piece 51 when the contact portion 515 is disposed at the position PT1 corresponds to the second position. This allows the relative movement in the −D direction of the contact portion 515, and thus the rotation in the +D direction of the rotator 42A that passes the reference position.

The path forming portion 493 is inclined to the −D direction and the −Z direction to be located in the −Z direction toward the −D direction. A surface in the −Z direction of the path forming portion 493 forms a first path RT41, of the movement path RT4, along which the contact portion 515 disposed at the position PT1 in the clockwise-side range moves in the −D direction to reach a second path RT42. A surface in the +Z direction of the path forming portion 491 forms a portion of the second path RT42, of the movement path RT4, along which the contact portion 515 having reached the movement limit in the −D direction in the clockwise-side range moves to reach the restricting portion 494. A length in the +D direction of the first path RT41 is approximately the same as a length in the −D direction of the second path RT42. A surface in the −Z direction forming the first path RT41 in the path forming portion 493 and a surface in the +Z direction forming the portion of the second path RT42 in the path forming portion 493 are each inclined to the circumferential direction about the rotation axis Rx.

When the rotator 42A located at the reference position is rotated in the +D direction, the contact portion 515 moves along the first path RT41 from the position PT1, and reaches, for example, the position PT6. In a state where the contact portion 515 is located on the first path RT41, when the rotator 42A is rotated in the −D direction, the contact portion 515 moves relatively in the +D direction along the first path RT41. In this case, the contact portion 515 does not come into contact with the restricting portion 494, and thus the rotation of the rotator 42A that passes the reference position is not restricted.

When the rotator 42A is further rotated in the +D direction and the contact portion 515 reaches a movement limit in the −D direction in the clockwise-side range, the contact portion 515 and the path forming portion 493 are separated from each other, and the contact portion 515 reaches the second path RT42 that connects the movement limit in the −D direction and a position PT9 (the first position in the clockwise-side range). At this time, a position in the +Z direction of the contact portion 515 matches a position in the +Z direction of the contact portion 515 when the contact piece 51 is disposed at the position PT1 owing to the biasing force of the first biasing member 52. Accordingly, when the rotator 42A is rotated to the rotation limit in the +D direction in the state where the contact portion 515 is separated from the path forming portion 493, the contact portion 515 is moved to the movement limit in the −D direction along the second path RT42 with the position in the +Z direction unchanged.

Here, an end in the −D direction of the path forming portion 493 is located in the −Z direction relative to an end in the −Z direction of the contact portion 515 when the contact piece 51 is disposed at the position PT1. Thus, when the contact portion 515 is moved in the +D direction by the rotator 42A being rotated in the −D direction, the contact portion 515 comes into contact with a surface on the +Z direction of the path forming portion 493 as indicated by the position PT7. When the rotator 42A is further rotated in the −D direction, the contact portion 515 reaches the position PT8.

In a state where the contact portion 515 is disposed on the second path RT42, when the rotator 42A is rotated in the −D direction and reaches the reference position, the contact portion 515 reaches the position PT9 that is in contact with the restricting portion 494 provided on an extension of the second path RT42. A position of the contact piece 51 when the contact portion 515 is disposed at the position PT9 corresponds to the first position in the clockwise-side range. Movement in the +D direction of the contact portion 515 having reached the position PT9 is restricted by the restricting portion 494, and thus the rotation in the −D direction of the rotator 42A is restricted. That is, the rotation of the rotator 42A in the −D direction from the reference position is restricted by the contact piece 51 being at the first position in the clockwise-side range.

When rotating force in the −D direction applied to the rotator 42A is reduced by, for example, the user releasing his or her finger from the knob 43, in the state where the contact piece 51 is located at the first position, the contact portion 515 returns to the position PT1 owing to the biasing force in the −Z direction of the first biasing member 52. As described above, the position of the contact piece 51 when the contact portion 515 is disposed at the position PT1 corresponds to the second position. This allows the relative movement in the +D direction of the contact portion 515, and thus the rotation in the −D direction of the rotator 42A that passes the reference position.

As described above, the rotator 42A has a cylindrical cam structure in which the movement paths RT3 and RT4 are provided. The movement paths RT3 and RT4 each allow the contact piece 51 to move in a direction along the rotation axis Rx when the rotator 42A is rotated about the rotation axis Rx.

In the exemplary embodiment, the path forming portion 491 that configures the second path RT32 and the path forming portion 493 that configures the second path RT42 are not provided in the vicinity of the first position, and thus the contact piece 51 is movable to the second position at a timing at which the contact piece 51 reaches the first position. In the rotary operator 2A according to the exemplary embodiment also, as with the rotary operator 2 according to the first exemplary embodiment, it is possible to keep a balance regarding ease of movement of the contact piece 51 from the first position to the second position.

For example, the contact piece 51 has difficulty returning to the second position by, for example, increasing in the distance between the first position and the second position.

Further, the contact piece 51 has difficulty returning to the second position by, for example, controlling a movement rate in the ±Z directions of the contact piece 51 with use of a viscous lubricant or the like.

Effects of Second Exemplary Embodiment

The acoustic device according to the exemplary embodiment described above has the same effects as those of the acoustic device 1 according to the first exemplary embodiment.

That is, the acoustic device according to the exemplary embodiment includes the rotary operator 2A.

The rotary operator 2A includes the rotator 42A and the contact piece 51. The movement paths RT3 and RT4 inclined to the circumferential direction about the rotation axis Rx are provided for the outer circumferential surface 49A of the rotator 42A. The rotator 42A is rotated about the rotation axis Rx. The contact piece 51 comes into contact with the rotator 42A, and moves along the movement paths RT3 and RT4 in the direction along the rotation axis Rx in association with the rotation of the rotator 42A.

In the counterclockwise-side range, the rotation of the rotator 42A in the +D direction (the first rotation direction) about the rotation axis Rx is restricted by the contact piece 51 being at the first position in the counterclockwise-side range when the rotator 42A is rotated in the +D direction and reaches the reference position. The +D direction is the clockwise direction.

When the rotating force in the +D direction applied to the rotator 42A is reduced in the state where the rotation of the rotator 42A in the +D direction from the reference position is restricted, the contact piece 51 returns to the second position, thereby allowing the rotation of the rotator 42A in the +D direction from the reference position.

Further, in the clockwise-side range, the rotation of the rotator 42A in the −D direction (the first rotation direction) about the rotation axis Rx is restricted by the contact piece 51 being at the first position in the clockwise-side range when the rotator 42A is rotated in the −D direction and reaches the reference position. The −D direction is the counterclockwise direction.

When the rotating force in the −D direction applied to the rotator 42A is reduced in the state where the rotation of the rotator 42A in the −D direction from the reference position is restricted, the contact piece 51 returns to the second position, thereby allowing the rotation of the rotator 42A in the −D direction from reference position.

With such a configuration, it is possible to restrict the rotator 42A rotated in the +D direction from being erroneously rotated in the +D direction beyond the reference position. This makes it possible to easily rotate the rotator 42A in the ±D directions in the rotation range (the counterclockwise-side range) from the reference position to the rotation limit in the −D direction. When the rotator 42A rotated in the +D direction reaches the reference position, the rotating force in the +D direction applied to the rotator 42A is reduced, whereby the contact piece 51 returns to the second position and it is possible to rotate the rotator 42A in the +D direction from the reference position. This makes it possible not only to restrict the rotation of the rotator 42A in the +D direction from the reference position, but also to allow the rotation of the rotator 42A in the +D direction from the reference position.

Similarly, it is possible to restrict the rotator 42A rotated in the −D direction from being erroneously rotated in the −D direction beyond the reference position. This makes it possible to easily rotate the rotator 42A in the ±D directions in the rotation range (the clockwise-side range) from the reference position to the rotation limit in the +D direction. When the rotator 42A rotated in the −D direction reaches the reference position, the rotating force in the −D direction applied to the rotator 42A is reduced, whereby the contact piece 51 returns to the second position and it is possible to rotate the rotator 42A in the −D direction from the reference position. This makes it possible not only to restrict the rotation of the rotator 42A in the −D direction from the reference position, but also to allow the rotation of the rotator 42A in the −D direction from the reference position.

Operability of the rotary operator 2 is thus improved.

Modifications of Exemplary Embodiment

The disclosure is not limited to the above exemplary embodiments, and modifications and improvements within the scope of achieving the disclosure objects are included in the disclosure.

Figure 24:
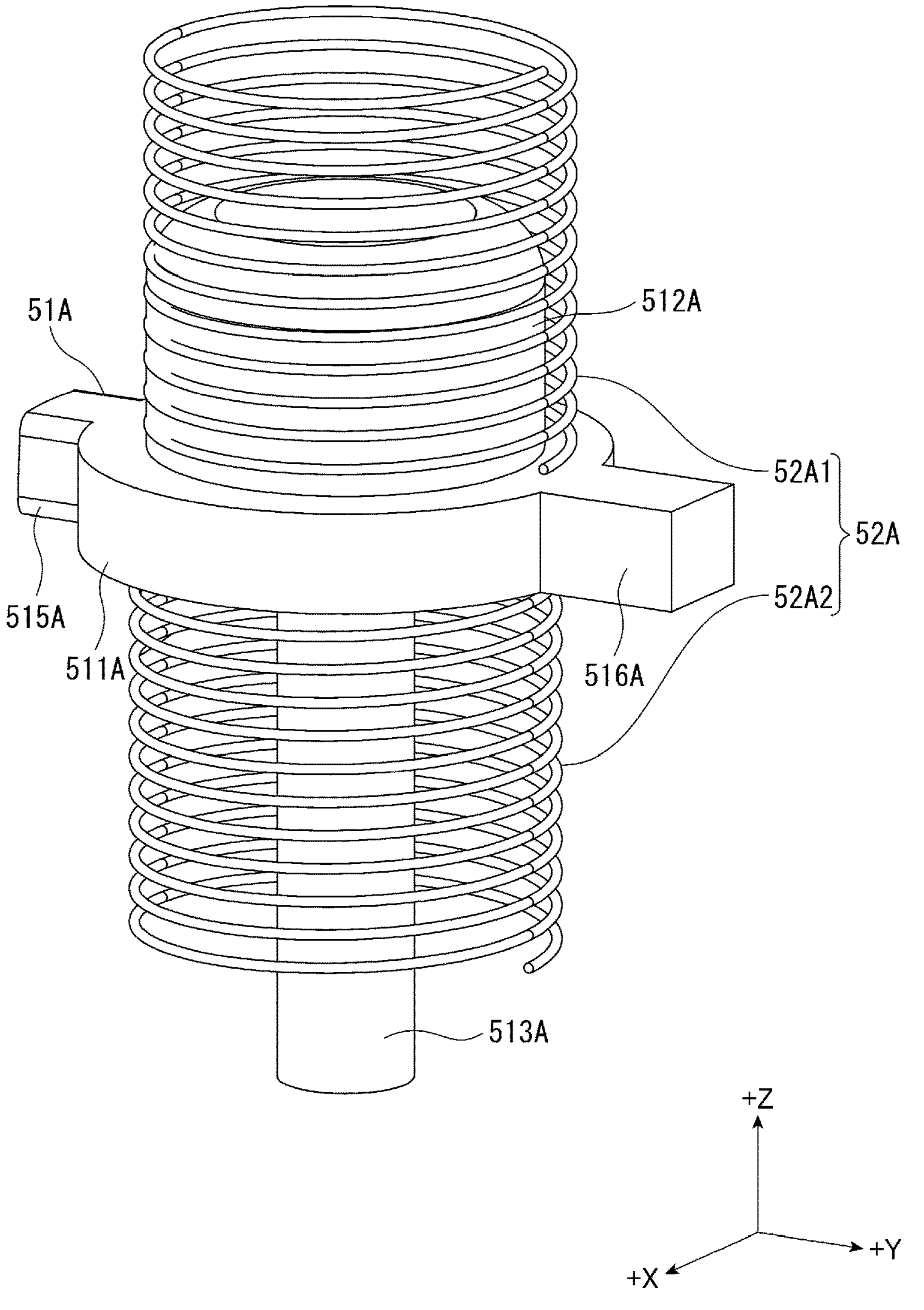
FIG. 24 is a perspective view of an operator and a first biasing member according to a modification.

FIG. 24 is a perspective view of a contact piece 51A and a first biasing member 52A that are modifications of the contact piece 51 and the first biasing member 52.

In the above-described exemplary embodiments, the first biasing member 52 is one compression coil spring, and the contact piece 51 is biased by the first biasing member 52. However, the disclosure is not limited thereto, and the first biasing member 52 may include, for example, a compression coil spring 52A1 provided in the +Z direction and a compression coil spring 52A2 provided in the −Z direction, as illustrated in FIG. 24, for example.

Further, instead of the contact piece 51, the contact piece 51A illustrated in FIG. 24, for example, may be employed. The contact piece 51A includes a contact piece body 511A, a contact portion 515A protruding in the −Y direction from the contact piece body 511A to come into contact with the rotator 42, and a protrusion 516A protruding in the +Y direction from the contact piece body 511A to be inserted into the guide 344. The contact piece body 511A includes a protrusion 512A protruding in the +Z direction to be inserted into the compression coil spring 52A1, and a protrusion 513A protruding in the −Z direction to be inserted into the compression coil spring 52A2.

When a clamp portion that clamps the contact piece 51A and the first biasing member 52A in the +Z direction is provided in the casing 3, it is possible to bias the contact portion 515A to be disposed on the bottom 461 of the recess 46 or at the position PT1 owing to the biasing force of the first biasing member 52A.

In the first exemplary embodiment, the rotator 42 includes the path forming portions 47 and 48. In the second exemplary embodiment, the rotator 42A includes the path forming portions 491 and 493 and the restricting portions 492 and 494. However, the disclosure is not limited thereto, and the rotator 42 may include one of the path forming portion 47 or the path forming portion 48. In this case, the restricting portion 481 may be provided separately. Similarly, the rotator 42A may include one of the following combinations: the path forming portion 491 and the restricting portion 492; and the path forming portion 493 and the restricting portion 494.

In the first exemplary embodiment, the restricting portion 471 includes the guide surface 473, and the restricting portion 481 includes the guide surface 483. However, the disclosure is not limited thereto, and the restricting portions 471 and 481 may not include the guide surfaces 473 and 483 depending on configurations of the path forming portions 47 and 48.

In the above-described exemplary embodiments, the rotary operators 2 and 2A each include the first biasing member 52 that biases the contact piece 51 in the direction from the first position toward the second position. However, the disclosure is not limited thereto, and the first biasing members 52 and 52A may be omitted as long as the contact piece 51 being in contact with the restricting portions 471, 481, 492, and 494 can be located at the second position when the rotating force applied to the rotators 42 and 42A is reduced. Further, the first biasing members 52 and 52A may not be configured by the compression coil spring, and may be configured by any other member such as magnets.

In the first exemplary embodiment, the path forming portion 47 that forms the movement path RT1 and the path forming portion 48 that forms the movement path RT2 protrude radially outward about the rotation axis Rx from the outer circumferential surface 45A. In the second exemplary embodiment, the path forming portion 491 that forms the movement path RT3, the path forming portion 493 that forms the movement path RT4, and the restricting portions 492 and 494 protrude radially outward about the rotation axis Rx from the outer circumferential surface 49A. However, the disclosure is not limited thereto, and the movement path along which the contact piece 51 moves may be formed by a groove provided in the outer circumferential surface of the rotator.

In the above-described exemplary embodiments, the first biasing member 52 biases the contact piece 51 in the +Z direction and the −Z direction along the rotation axis Rx. However, the disclosure is not limited thereto, and the direction in which the first biasing member 52 biases may not necessarily be a direction along the rotation axis Rx. That is, the direction in which the first biasing members 52 and 52A bias the contact piece 51 may be another direction as long as the contact piece 51 being in contact with the restricting portions 471, 481, 492, and 494 can return to the second position.

In the first exemplary embodiment, the second path RT12 is longer in the +D direction than the first path RT11, and the second path RT22 is longer in the −D direction than the first path RT21. However, the disclosure is not limited thereto, and the first path RT11 may be longer in the +D direction than the second path RT12, and the first path RT21 may be longer in the −D direction than the second path RT22. Alternatively, as with the first paths RT31 and RT41 and the second paths RT32 and RT42 according to the second exemplary embodiment, the length in the +D direction of the first path RT11 may be substantially the same as the length in the +D direction of the second path RT12, and the length in the −D direction of the first path RT21 may be substantially the same as the length in the −D direction of the second path RT22.

In the above-described exemplary embodiments, the rotary operators 2 and 2A each include the second biasing member 53 that biases the contact piece 51 toward the rotation axis Rx of the rotator 42. However, the disclosure is not limited thereto, and the second biasing member 53 may be omitted as long as the rotary operators 2 and 2A each do not include the state switching mechanism 7 and each have a configuration in which the rotation of the rotators 42 and 42A that passes the reference position is restricted.

Further, the contact piece 51 does not necessarily have to be in contact with the outer circumferential surfaces 45A and 49A of the rotators 42 and 42A.

In the above-described exemplary embodiments, the reference positions of the rotators 42 and 42A, serving as the predetermined positions, are the positions at which the lengths from the reference positions to the rotation limits in the +D direction of the rotators 42 and 42A are equal to the lengths from the reference positions to the rotation limits in the −D direction of the rotators 42 and 42A. In other words, the position of the rotator 42 when the indicating line 431 is parallel to the −X direction and is directed to the −X direction is set as a reference position. However, the disclosure is not limited thereto, and the reference position is appropriately settable within the range from the rotation limit in the −D direction to the rotation limit in the +D direction.

In the above-described exemplary embodiments, the acoustic device 1 includes the operational-feeling switching mechanism 6 and the state switching mechanism 7. However, the disclosure is not limited thereto, and at least one of the operational-feeling switching mechanism 6 or the state switching mechanism 7 may be omitted. In addition, the rotary operators 2 and 2A each may not include the casing 3 as long as the position relationship between the corresponding one of the rotators 42 and 42A and the contact piece 51 is appropriately maintainable.

In the above-described exemplary embodiments, the rotary operators 2 and 2A are each employed in the acoustic device 1 that is the mixer. However, the disclosure is not limited thereto, and the acoustic device that employs the rotary operator of the disclosure may be another acoustic device such as a DJ controller or another electronic device.

Further, the rotary operators 2 and 2A are each applicable to the rotary operator that configures the effect adjuster 157, but it is not limited thereto. The rotary operator of the disclosure is also applicable to another adjuster.

Conclusion of Disclosure

A conclusion of the disclosure is described below.

[1] A rotary operator includes: a rotator including a movement path provided for an outer circumferential surface and inclined to a circumferential direction about a rotation axis, the rotator being configured to rotate about the rotation axis; and a contact piece configured to come into contact with the rotator, and move along the movement path in a direction along the rotation axis in association with rotation of the rotator, in which rotation of the rotator in a first rotation direction about the rotation axis is restricted by the contact piece being at a first position when the rotator is rotated in the first rotation direction and reaches a predetermined position; and when rotating force in the first rotation direction applied to the rotator is reduced in a state where rotation of the rotator in the first rotation direction from the predetermined position is restricted, the contact piece returns to a second position to allow the rotation of the rotator in the first rotation direction from the predetermined position.

With such a configuration, when the rotator rotated in the first rotation direction reaches the predetermined position, the rotation of the rotator in the first rotation direction is restricted at the predetermined position. According to this, it is possible to restrict the rotator from being erroneously rotated in the first rotation direction beyond the predetermined position. This makes it possible to easily rotate the rotator in the first rotation direction and in the direction opposite to the first rotation direction, in the rotation range from the predetermined position to the rotation limit in the direction opposite to the first rotation direction.

When the rotator rotated in the first rotation direction reaches the predetermined position, the rotating force in the first rotation direction applied to the rotator is reduced, whereby the contact piece returns to the second position. This makes it possible to rotate the rotator in the first rotation direction from the predetermined position.

Accordingly, it is possible not only to restrict the rotation in the first rotation direction from the predetermined position, but also to allow the rotation of the rotator in the first rotation direction from the predetermined position. Operability of the rotary operator is thus improved.

[2] The rotary operator according to [1] may further include a first biasing member that biases the contact piece in a direction from the first position toward the second position.

With such a configuration, the contact piece can easily return to the second position from the first position, when the rotating force in the first rotation direction applied to the rotator is reduced in the state where the rotation of the rotator in the first rotation direction from the predetermined position is restricted. It is therefore possible to easily perform the rotation of the rotator in the first rotation direction from the predetermined position, and to improve operability of the rotary operator.

[3] In the rotary operator according to [1] or [2], the rotator may include a restricting portion that comes into contact with the contact piece when the rotator is rotated in the first rotation direction and reaches the first position, and restricts relative movement of the contact piece with respect to the rotator in a direction opposite to the first rotation direction.

With such a configuration, it is possible to restrict the rotator, which has reached the predetermined position by being rotated in the first rotation direction, from further rotating in the first rotation direction by the contact piece coming into contact with the restricting portion. The first biasing member biases the contact piece in the direction from the first position toward the second position. Thus, when the above-described rotating force is reduced, the contact piece easily returns to the second position owing to the biasing force of the first biasing member.

Operability of the rotary operator is thus improved.

[4] In the rotary operator according to any one of [1] to [3], the movement path may include: a first path along which the contact piece moves relatively with respect to the rotator in the direction opposite to the first rotation direction from the second position, when the rotator is rotated in the first rotation direction from the predetermined position; and a second path by which the contact piece is led to the first position when the rotator having been rotated in the first rotation direction from the predetermined position is rotated in the direction opposite to the first rotation direction.

With such a configuration, when the rotator rotated in the first rotation direction reaches the predetermined position in the state where the contact piece reaches the second path, it is possible to lead the contact piece to the first position. Accordingly, it is possible to restrict the rotator rotated in the first rotation direction from being rotated beyond the predetermined position.

[5] In the rotary operator according to [4], a length of the first path in the first rotation direction may be shorter than a length of the second path in the first rotation direction.

With such a configuration, it is possible to cause the contact portion to reach the second path from the first path with a small rotation amount of the rotator from the predetermined position. The second path is a path by which the contact piece is led to the first position. Thus, it is possible to locate the contact piece at the first position when the rotator reaches the predetermined position. Accordingly, it possible to restrict the rotation of the rotator that passes the predetermined position.

[6] The rotary operator according to [4] or [5] may further include a second biasing member that biases the contact piece toward the rotation axis. The second path may be provided at a position closer to the rotation axis than the first path.

With such a configuration, it is possible to prevent the contact piece that has moved from the first path to the second path from returning to the first path. Accordingly, it is possible to restrict the rotation of the rotator in the first rotation direction that passes the first reference position.

[7] In the rotary operator according to any one of [1] to [6], the predetermined position may be a position where a length from the predetermined position to a rotation limit in the first rotation direction of the rotator is equal to a length from the predetermined position to a rotation limit in the direction opposite to the first rotation direction of the rotator.

With such a configuration, the predetermined position is a middle position in the rotatable range of the rotator. This makes it possible to allow the rotatable range in the first rotation direction from the predetermined position and the rotatable range in the direction opposite to the first rotation direction from the predetermined position to be equal to each other. Usability of the rotary operator is thus improved.

[8] An acoustic device includes the rotary operator according to any one of [1] to [7].

With such a configuration, it is possible to achieve effects similar to those described above.

[9] In the acoustic device according to [8], the rotary operator may configure an effect adjuster, the effect adjuster adjusting an effect amount of a first effect in accordance with a rotation angle of the rotator from the predetermined position toward the first rotation direction, and adjusting an effect amount of a second effect in accordance with a rotation angle of the rotator from the predetermined position toward the direction opposite to the first rotation direction.

With such a configuration, for example, the rotation of the rotator in the first rotation direction that passes the first reference position is restricted, making it possible to prevent the effect amount of the first effect from being erroneously adjusted when the effect amount of the second effect is being adjusted. Usability of the acoustic device is thus improved.

The invention claimed is:

1. A rotary operator, comprising:

a rotator comprising a movement path provided for an outer circumferential surface and inclined to a circumferential direction about a rotation axis, the rotator being configured to rotate about the rotation axis; and a contact piece configured to come into contact with the rotator, and move along the movement path in a direction along the rotation axis in association with rotation of the rotator, wherein rotation of the rotator in a first rotation direction about the rotation axis is restricted by the contact piece being at a first position when the rotator is rotated in the first rotation direction and reaches a predetermined position, and when rotating force in the first rotation direction applied to the rotator is reduced in a state where rotation of the rotator in the first rotation direction from the predetermined position is restricted, the contact piece returns to a second position to allow the rotation of the rotator in the first rotation direction from the predetermined position.

2. The rotary operator according to claim 1, further comprising a first biasing member configured to bias the contact piece in a direction from the first position toward the second position.

3. The rotary operator according to claim 1, wherein the rotator comprises a restricting portion configured to come into contact with the contact piece when the rotator is rotated in the first rotation direction and reaches the first position, and restrict movement of the contact piece with respect to the rotator in a direction opposite to the first rotation direction.

4. The rotary operator according to claim 1, wherein the predetermined position is a position where a length from the predetermined position to a rotation limit in the first rotation direction of the rotator is equal to a length from the predetermined position to a rotation limit in a direction opposite to the first rotation direction of the rotator.

5. The rotary operator according to claim 1, wherein the movement path comprises a first path along which the contact piece moves with respect to the rotator in a direction opposite to the first rotation direction from the second position, when the rotator is rotated in the first rotation direction from the predetermined position, and a second path by which the contact piece is led to the first position when the rotator having been rotated in the first rotation direction from the predetermined position is rotated in the direction opposite to the first rotation direction.

6. The rotary operator according to claim 5, wherein a length of the first path in the first rotation direction is shorter than a length of the second path in the first rotation direction.

7. The rotary operator according to claim 5, further comprising a second biasing member configured to bias the contact piece toward the rotation axis, wherein the second path is provided at a position closer to the rotation axis than the first path.

8. An acoustic device comprising the rotary operator according to claim 1.

9. The acoustic device according to claim 8, wherein the rotary operator configures an effect adjuster, the effect adjuster being configured to adjust an effect amount of a first effect in accordance with a rotation angle of the rotator from the predetermined position toward the first rotation direction, and adjust an effect amount of a second effect in accordance with a rotation angle of the rotator from the predetermined position toward a direction opposite to the first rotation direction.

* * * * *